United States Patent
Zhou et al.

(10) Patent No.: US 10,290,064 B2
(45) Date of Patent: May 14, 2019

(54) SYSTEM, METHOD AND APPARATUS FOR CAPACITY DETERMINATION FOR MICRO GRID AND TANGIBLE COMPUTER READABLE MEDIUM

(71) Applicant: Accenture Global Services Limited, Dublin (IE)

(72) Inventors: Qin Zhou, Beijing (CN); Zhejing Bao, Beijing (CN); Zhihui Yang, Beijing (CN); Jianhua Zhang, Beijing (CN)

(73) Assignee: Accenture Global Services Limited, Dublin (IE)

( * ) Notice: Subject to any disclaimer, the term of this patent is extended or adjusted under 35 U.S.C. 154(b) by 45 days.

(21) Appl. No.: 15/520,370

(22) PCT Filed: Oct. 21, 2014

(86) PCT No.: PCT/CN2014/088992
§ 371 (c)(1),
(2) Date: Apr. 19, 2017

(87) PCT Pub. No.: WO2016/061741
PCT Pub. Date: Apr. 28, 2016

(65) Prior Publication Data
US 2017/0308968 A1    Oct. 26, 2017

(51) Int. Cl.
*G05D 23/00*    (2006.01)
*G06Q 50/06*   (2012.01)
(Continued)

(52) U.S. Cl.
CPC ............ *G06Q 50/06* (2013.01); *G06Q 10/04* (2013.01); *H02J 3/00* (2013.01); *H02J 3/14* (2013.01);
(Continued)

(58) Field of Classification Search
CPC ........................................................ G06Q 50/06
(Continued)

(56) References Cited

U.S. PATENT DOCUMENTS 8,762,196 B2 * 6/2014  Sharma .................. G06Q 40/06
                                                            705/7.36
9,244,446 B2 * 1/2016  Bhageria ................ G05B 15/02
(Continued)

FOREIGN PATENT DOCUMENTS

CN        102930343 A      2/2013
CN        103353979 A      10/2013
(Continued)

OTHER PUBLICATIONS

Parisio et al, Energy Efficient Microgrid Management using Model Predictive Control, Dec. 15, 2011, IEEE, pp. 6 (Year: 2011).*
(Continued)

*Primary Examiner* — Suresh Suryawanshi
(74) *Attorney, Agent, or Firm* — Brinks Gilson & Lione

(57) ABSTRACT

The present disclosure presents a system, method, and apparatus for capacity determination in a micro grid, and a tangible computer readable medium. The micro grid comprises multi-type energy supply devices to provide both electricity and thermal energy, In embodiments of the present disclosure, a capacity determination process for minimizing both annual integrated cost for the micro grid and annual energy outage cost, is performed under constraints on electricity supply/demand balance and thermal energy supply/demand balance, and operation constraints on the multi-type energy supply devices, to determine respective numbers or energy supply capacity of the multi-type energy supply device. With embodiments of the present disclosure, it may achieve an optimal capacity termination which could (Continued)

provide a significant cost saving and at the same time guarantees the operation reliability of the micro grid.

20 Claims, 14 Drawing Sheets

(51) Int. Cl.
- *H02J 3/00* (2006.01)
- *G06Q 10/04* (2012.01)
- *H02J 3/14* (2006.01)
- *H02J 3/38* (2006.01)

(52) U.S. Cl.
CPC ......... *H02J 3/381* (2013.01); *H02J 2003/007* (2013.01); *H02J 2003/146* (2013.01); *Y02B 70/3225* (2013.01); *Y04S 20/222* (2013.01); *Y04S 20/224* (2013.01)

(58) Field of Classification Search
USPC .......................................................... 700/291
See application file for complete search history.

(56) References Cited

U.S. PATENT DOCUMENTS

| | | | | |
|---|---|---|---|---|
| 9,733,623 | B2* | 8/2017 | Yang | H02J 3/00 |
| 2011/0082597 | A1* | 4/2011 | Meagher | H02J 3/38 |
| | | | | 700/291 |
| 2011/0231028 | A1* | 9/2011 | Ozog | G06Q 10/06 |
| | | | | 700/291 |
| 2014/0203639 | A1 | 7/2014 | Rozman et al. | |
| 2015/0268643 | A1* | 9/2015 | Patil | H02S 10/00 |
| | | | | 700/287 |

FOREIGN PATENT DOCUMENTS

| | | |
|---|---|---|
| CN | 103490410 A | 1/2014 |
| CN | 103617460 A | 3/2014 |

OTHER PUBLICATIONS

Koski et al, On the Energy Management in Data Center's Microgrid, 2011, IEEE, pp. 4 (Year: 2011).*

Zadeh et al, Design and Implementation of a Microggrid Controller, 2011, IEEE, pp. 9 (Year: 2011).*

Choi et al, A Microgrid Energy Management System for Inducing Optimal Demand Response, 2011, IEEE, pp. 6 (Year: 2011).*

Sortomme et al, Optimal Power Flow for a System of Microgrids with Contollable Loads and Battery Storage, 2009, IEEE, pp. 5 (Year: 2009).*

Chen et al, Smart energy management system for optimal microgrid economic operation, 2010, IET Renewable Power Generation, pp. 10 (Year: 2010).*

International Search Report and Written Opinion dated Jul. 20, 2015, pp. 1-13, International Patent Application No. PCT/CN2014/088992, State Intellectual Property Office of the P.R. China (ISA/CN), Beijing, China.

Australian Examination Report No. 1, dated Nov. 9, 2017, pp. 1-4, issued in Australian Patent Application No. 2014409485, Offices of IP Australia, Woden, ACT, Australia.

Australian Examination Report No. 2, dated Apr. 12, 2018, pp. 1-5, issued in Australian Patent Application No. 2014409485, Offices of IP Australia, Woden, ACT, Australia.

* cited by examiner

SYSTEM, METHOD AND APPARATUS FOR CAPACITY DETERMINATION FOR MICRO GRID AND TANGIBLE COMPUTER READABLE MEDIUM

TECHNICAL FIELD

Embodiments of the present disclosure relate to the field of power grid technology and more particularly to a system, method, and apparatus for capacity determination in a micro grid, and a tangible computer readable medium.

BACKGROUND

Various industries have networks associated with them. One such industry is the utility industry that manages a power grid. The power grid may include one or all of the following: electricity generation, electric power transmission, and electricity distribution. Electricity may be generated using generating stations, such as a coal fire power plant, a nuclear power plant, etc. For efficiency purposes, the generated electrical power is stepped up to a very high voltage (such as, for example, 345K Volts) and transmitted over transmission lines. The transmission lines may transmit the power long distances, such as across state lines or across international boundaries, until it reaches its wholesale customer, which may be a company that owns the local distribution network. The transmission lines may terminate at a transmission substation, which may step down the very high voltage to an intermediate voltage (such as, for ex ample, 138K Volts). From a transmission substation, smaller transmission lines (such as, for example, sub-transmission lines) transmit the intermediate voltage to distribution substations. At the distribution substations, the intermediate voltage may be again stepped down to a "medium voltage" (such as, for example, from 4K Volts to 23K Volts). One or more feeder circuits may emanate from the distribution substations. For example, four to tens of feeder circuits may emanate from the distribution substation. The feeder circuit is a 3-phase circuit comprising 4 wires (three wires for each of the 3 phases and one wire for neutral). Feeder circuits may be routed either above ground (on poles) or underground. The voltage on the feeder circuits may be tapped off periodically using distribution transformers, which step down the voltage from "medium voltage" to the consumer voltage (such as, for example, 120V). The consumer voltage may then be used by the consumers.

To meet customers' demands on multi-type energy locally, distributed generation (DG) and smart grid has been developed. With their increasingly development, a micro grid (MG) is playing a more and more important role in DG penetration handling, utilization of renewable energy and emission mitigation. The MG could further provide both heating energy and cooling energy to the customers with higher energy utilization efficiency. Therefore, more and more MG projects are under planning and construction. In a power grid including the MG, the equipment utilization and device cost are highly dependent on device capacity determination. Therefore, it is very important to determine suitable capacity for the MG so that the equipment can be utilized efficiently and at the same time, the customer's energy demands can be met.

However, in the prior art, there is no such a capacity determination approach specifically for the MG. Besides, capacity determination approaches for the traditional bulk power grid cannot be used for the MG because, quite different from the traditional bulk power grid, the MG includes multi-type energy source devices, which can supply a plurality of energies, such as the electricity, the heating energy and the cooling energy.

Thus, in the art, there is a need for an optimal capacity determination approach for the MG.

SUMMARY OF THE DISCLOSURE

According to an aspect of the present disclosure, there is provided a system for capacity determination for a micro grid. The micro grid may comprise multi-type energy supply devices to provide both electricity and thermal energy. The system may comprise: at least one processor; and at least one memory storing computer executable instructions. The at least one memory and the computer executable instructions may be configured to, with the at least one processor, cause the system to: perform, a device capacity determination process for minimizing both annual integrated cost for the micro grid and annual energy outage cost, under constraints on electricity supply/demand balance and thermal energy supply/demand balance, and operation constraints on the multi-type energy supply devices, to determine respective numbers or capacities of the multi-type energy supply devices.

According to another aspect of the present disclosure, there is provided a method for capacity determination for a micro grid. The micro grid comprises multi-type energy supply devices to provide both electricity and thermal energy. The method may comprise: performing, a device capacity determination process for minimizing both annual integrated cost for the micro grid and annual energy outage cost, under constraints on electricity supply/demand balance and thermal energy supply/demand balance, and operation constraints on the multi-type energy supply devices, to determine respective numbers or capacities of the multi-type energy supply devices.

According to a further aspect of the present disclosure, there is provided an apparatus for capacity determination for a micro grid, wherein the micro grid comprises multi-type energy supply devices to provide both electricity and thermal energy. The apparatus comprising: means for performing, a device capacity determination process for minimizing both annual integrated cost for the micro grid and annual energy outage cost, under constraints on electricity supply/demand balance and thermal energy supply/demand balance, and operation constraints on the multi-type energy supply devices, to determine respective numbers or capacities of the multi-type energy supply device.

According to a yet further aspect of the present disclosure, there is provided another apparatus for integrated multi-energy scheduling in a micro-grid. The micro grid comprises multi-type energy supply devices to provide both electricity and thermal energy. The apparatus may comprise: a process performing module configured to perform, a device capacity determination process for minimizing both annual integrated cost for the micro grid and annual energy outage cost, under constraints on electricity supply/demand balance and thermal energy supply/demand balance, and operation constraints on the multi-type energy supply devices, to determine respective numbers or capacities of the multi-type energy supply device.

According to a still yet further aspect of the present disclosure, there is provided a tangible computer-readable medium having a plurality of instructions executable by a processor to schedule multi-energy in a micro grid. The tangible computer-readable medium may comprise instructions configured to perform steps of the method according to the aspect of present disclosure.

Embodiments of the present disclosure provide a capacity determination solution for the micro grid with multi-type energy supply devices, which will perform a capacity determination process which considers both annual integrated cost and the operation reliability. Thus, with embodiments of the present disclosure, it may achieve a great cost saving and at the same time the operation reliability can be guaranteed.

Additionally, in some embodiments of the present disclosure, an optimal energy scheduling process may be pre-performed by determining operation priorities of the multi-type energy supply devices and an operation mode of the CCHP 10 unit at each time interval in a scheduling period. In such a way, it could greatly facilitate the result searching of optimal solutions of the device capacity determination process.

Besides, in further embodiments of the present disclosure, the integrated multi-energy scheduling process may be performed by means of Multi-Objective Particle Swarm Optimization (MOPSO) algorithm and thus it provides one of feasible approaches to find costfeasible optimal solution sets of the device capacity determination process. That is to say, the capacity determination solution of the present disclosure could provide a more feasible capacity determination results for the multi-type energy supplies in the micro grid.

BRIEF DESCRIPTION OF THE DRAWINGS

The above and other features of the present disclosure will become more apparent through detailed explanation on the embodiments as illustrated in the embodiments with reference to the accompanying drawings wherein like reference numbers represent same or similar components throughout the accompanying drawings of the present disclosure, wherein.

DETAILED DESCRIPTION OF EMBODIMENTS

Hereinafter, embodiments of the present disclosure will be described with reference to the accompanying drawings. In the following description, numerous specific details are set forth in order to provide a thorough understanding of the embodiments. However, it is apparent to the skilled in the art that implementation of the present disclosure may not have these details and the present disclosure is not limited to the particular embodiments as introduced herein. On the contrary, any arbitrary combination of the following features and elements may be considered to implement and practice the present disclosure, regardless of whether they involve different embodiments. Thus, the following aspects, features and embodiments are only for illustrative purposes, and should not be understood as elements or limitations of the appended claims, unless otherwise explicitly specified in the claims. Additionally, in some instances, well known methods and structures have not been described in detail so as not to unnecessarily obscure the embodiments of the present disclosure.

Next, for a purpose of illustration, an example micro grid will be described first so that the skilled in the art can better understood embodiments of the present disclosure.

As is known, the micro grid was a concept proposed as a new-type network topology under a circumstance that great efforts have been made to develop renewable and clean distributed generators (DGs) in order to achieve energy saving and emission reduction. The micro grid may be viewed as a cluster of renewable and clean DGs, such as photovoltaic (PV) panels, wind turbines (WTs) and Combined Cooling Heating and Power (CCHP) units, etc., to satisfy the customers' multi-type energy demands locally. Compared to a macro-grid, the micro grid is a small scale energy supplying system that is autonomous and capable of being self-controlled, protected, and managed. In practice, the micro grid could be either connected to the power grid or operated as a standalone power system to provide electric energy and/or heat or cooling energy to the end customers within the micro grid. Moreover, when the micro grid is connected to a bulk power grid (i.e., the macro-grid), it could provide the electricity back to/obtain the electricity from the bulk power grid as well.

Hereinafter, reference will be first made to FIG. 1 to describe an exemplary architecture of the micro grid for which embodiments of the present disclosure may be implemented. However, it should be appreciated, this architecture is presented only for a purpose of illustration, and the present disclosure may be also implemented in a different architecture.

Figure 1:
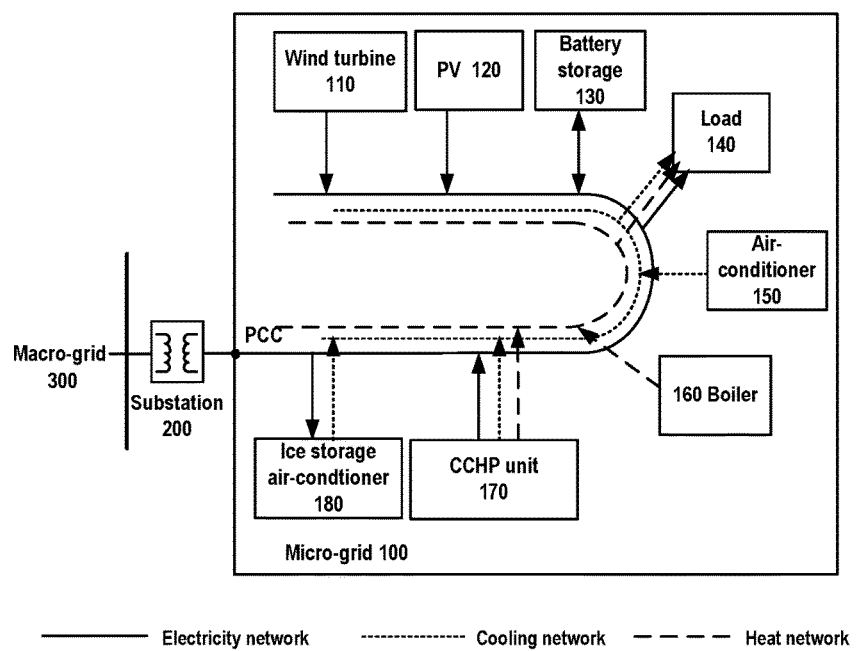
FIG. 1 schematically illustrates an exemplary architecture of a micro grid in which embodiments of the present disclosure may be implemented.

As illustrated in FIG. 1, the micro grid system 100 may be connected with a macro grid 300 (also may be referred to as a bulk power grid, a big power grid and so on) via a substation 200. In FIG. 1, the micro grid system 100 integrates different types of renewable energy sources (such as a wind power generator 110, a PV solar generator 120 etc., a CCHP unit 170 and an ice storage air-conditioner 180) together. The micro grid system 100 may further include an energy storage such as battery storage 130, various loads such as loads 140, an ordinary cooling energy supply such as air-conditioner 150, and ordinary heating energy supply such as fuel gas boiler 160. Each of loads 140 may be an electric load, a cold load or a heat load or any combination thereof. Within the micro grid system 100, the wind turbine 110 and the PV solar generator 120 will provide electricity energy; the CCHP unit 170 uses fuel gas(such as natural gas) as primary energy to provide the electricity, and at the same time, its generated heat energy during the electricity generating process could be collected and utilized to provide the cooling or heating energy, which depends on operation mode of the CCHP unit; the ice-storage air-conditioners 180 could behave either as an electricity load or as both electricity load and a cooling energy generator at the same time. Thus, for the micro grid, its electricity supply/demand balance and the cooling energy supply/demand balance or the heating energy supply/demand balance are coupled with each other due to working mode variations of CCHP unit and the ice-storage air conditioner. In the micro grid, the electricity could be supplied by electricity supply sources such as the wind power generator 110, the PV solar generator 120, the CCHP unit 170, the battery storage 130, and the macro grid 300; the cooling energy could be provided by ordinary air conditioners 150, the CCHP unit 170 and the ice-storage air-conditioner 180; the heating energy could be supplied by the fuel gas boiler 160 and the CCHP unit 170.

Thus, it can be seen that in the micro grid, the micro grid includes multi-type energy source devices (such as the wind power generator 110, the PV solar generator 120, the CCHP units 170, and the ice storage air-conditioner 180) which can supply both the electricity and the thermal energy. Herein the wording "thermal energy" is a general term of energy relating heating or cooling and in embodiments of the present disclosure, it may refer to the heating energy, the cooling energy or the combination thereof. Moreover, it may also be seen that some operations of these devices are usually coupled with each other and multi-energy coupled scheduling operations are preferable in the micro grid, which has an important effect on achieving the micro grid's higher operation efficiency. Besides, the micro-grid may operate in different operation modes, including the grid-connected node, the planned island mode and the unplanned island mode. All of factors will have different impacts to the MG capacity determination.

In view of this, an optimal capacity determination method for the micro grid is proposed to deal with the MG capacity determination issues in the art, which is to determine device capacities for all multi-type energy supply devices in the micro grid in an optimal way.

Hereinafter, reference will be made to FIG. 2 to describe a method for capacity determination for a micro grid. The micro grid comprises multi-type energy supply devices to provide both electricity and thermal energy. For example, the multi-type energy supply devices may comprise a renewable energy supply device, a battery storage, an ice-storage air-conditioner, a combined cooling, heating and power CCHP unit, an ordinary air-conditioning device, and an ordinary heating supply device, for example those illustrated in FIG. 1. However, it should be noted that some of these energy supply device may omitted or some new energy supply device may be further incorporated, which is dependent on specific application requirements.

Figure 2:
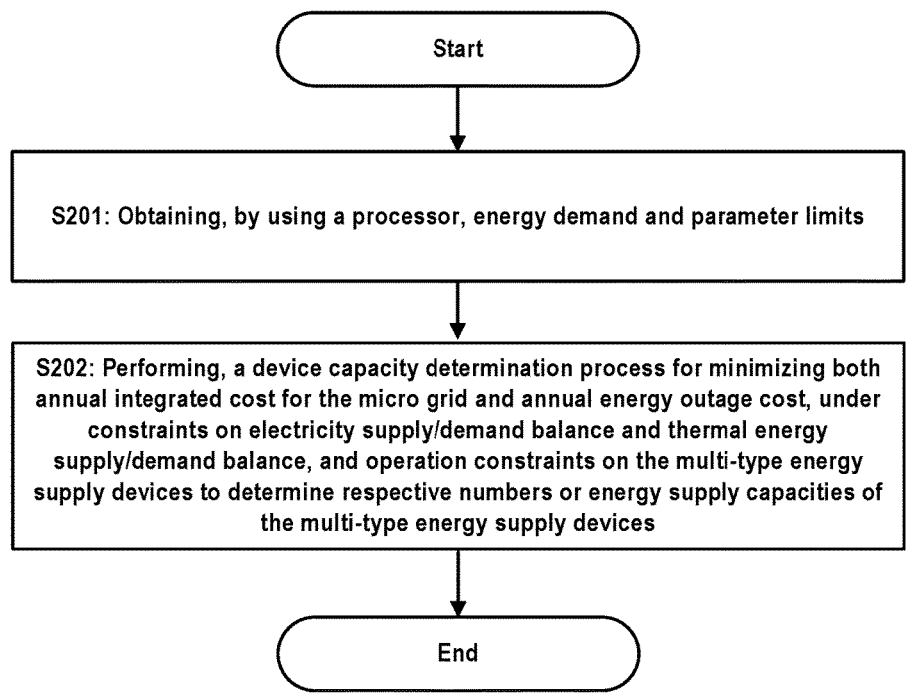
FIG. 2 schematically illustrates a flow chart of a method for capacity determination for a micro grid according to an example embodiment of the present disclosure.

As illustrated in FIG. 2, first at step S201, energy demands and parameter limits may be obtained, for example by a processor. In an embodiment of the present disclosure, the optimal capacity determination process may be performed for a one-year period and thus the energy demands for the whole year may be first obtained. The optimal capacity determination process may be performed on a basis of a predetermined time interval within one year, for example, one hour, and in such a case, the energy demands may include demand data for each hour in the one year. The energy demands may comprise the electricity demand and the thermal demand. The thermal demand may further comprise the heating demand and/or the cooling demand. For example, for some areas where it is cold through the year, there may be no any cooling demand, while some areas where it is hot all year around, there may be no any heating demand. For some other areas where there are both a hot season and a cold season, the thermal demand can include the heating demand and the cooling demand. Besides, it may set some limits to parameters, particularly limits to device capacities to be determined. For example, parameter limits may include limits to respective numbers or energy supply capacities of at least some of the multi-type energy supply devices. For example, the number of CCHP units, PV panels, wind turbines, rated power of the ice-storage air-conditioner, the ordinary heating energy supply device such as natural gas boilers. However, it may be appreciated that these parameter limits are set dependent specific application requirements and in some application, it is possible to use more or less limits or even omit these parameters limits.

Next, at step S202 a device capacity determination process for minimizing both annual integrated cost for the micro grid and annual energy outage cost is performed under constraints on electricity supply/demand balance and thermal energy supply/demand balance, and operation constraints on the multi-type energy supply devices, so as to determine respective numbers or energy supply capacities of the multi-type energy supply devices.

In an embodiment of the present disclosure, the annual integrated cost for the micro grid may comprise annual device investment cost, annual device operation cost, annual device maintenance cost and annual pollutant treatment cost, while the annual energy outage cost may comprise cost for electricity outage and cost for thermal energy outage. However, it can be appreciated that these are only presented for illustration purpose and in practice, and it is possible to uses more types of costs for the annual integrated cost and/or the annual energy outage cost, or omit some costs therefrom, which is dependent on specific application requirements.

Hereinafter, only for a purpose of illustration, an example capacity determination optimization model will be described. However, those skilled in the arts should appreciate that the present disclosure is not limited thereto, and it is also feasible to use any other suitable capacity determination optimization model.

Capacity Determination Optimization Model for the MG

In the MG construction, the important thing is to determine capacity of the multi-type energy supply devices in the MG with the aim of meeting the energy demands and at the same time minimizing costs. As mentioned before, in the MG, there are various energy supply devices, such as PV panels, wind turbines, ordinary air-conditioners, ice-storage air-conditioners, CCHP units, and natural gas boilers. Thus, the task of the capacity determination optimization process is to determine optimal numbers of CCHP units, PV panels cluster, and wind turbines, and rated power of ordinary air-conditioners, ice-storage air-conditioners and natural gas boilers, and the cooling energy capacity of ice-storage tank. In the example capacity determination model, these target parameters may be denoted by $N_{CCHP}$, $N_{PV}$, $N_{WT}$, $Q_{ordinary}$, $Q_{ice}$, $Q_{boiler}$, $C_{tank}$ respectively.

The ordinary air-conditioners are equipped to supply the cooling demand in valley time, and thus rated power of the ordinary air-conditioner $Q_{ordinary}$ can be derived by the maximum cooling demand at that time. The variable $C_{tank}$, i.e., the cooling energy capacity of ice-storage tank may be decided by the maximum daily cooling energy supplied by ice-melting. The maximum daily cooling energy supplied by ice-melting can be obtained according to the scheduling results from an optimal MG operation strategy, which will be described hereinafter.

In an embodiment of the present disclosure, there can be provided two optimization objectives, one of which is a MG cost objective and the other of which is a MG reliability objective. The MG cost objective is to minimize the total annual integrated cost, while the MG reliability objective is to minimize the energy outage cost so as to ensure the reliability of the MG.

In an embodiment of the present disclosure, the total annual integrated cost may include annual device investment cost, annual device operation cost (including, for example, cost of buying natural gas for the natural gas boilers and the CCHP units, cost of buying electricity from the macro grid, etc.), annual device maintenance cost and annual pollutant treatment cost In an example embodiment of the present disclosure, the first optimization objective may be expressed as follows:

$$\min f_1 = C_I + C_{N\_G} + C_{Exch\_E} + C_{emiss} \circ C_{O\&M} \quad (1)$$

wherein $C_I$ denotes total annualized investment cost of all energy source devices;

$C_{N\_G}$ denotes annual cost of buying natural gas for operations of the natural gas boilers and the CCHP units;

$C_{Exch\_E}$ denotes annual cost of buying the electricity from the macro grid;

$C_{emiss}$ denotes the annual pollutant emission treatment cost; and $C_{O\&M}$ denotes the annual cost of operation dependent maintenance.

The above-mentioned cost can be calculated in many different manners, but hereinafter, exemplary calculations thereof are provided only for a purpose of illustration.

Specifically, the total annual device investment costs $C_I$ can be calculated as:

$$C_I = \frac{r(1+r)^N}{(1+r)^N - 1} \quad (2)$$

$$(C_{I\_CCHP} + C_{I\_PV} + C_{I\_WT} + C_{I\_boiler} + C_{I\_ice} + C_{I\_ordinary})$$

wherein r denotes annualized real interest cost; N denotes use life of the micro grid; $r(1+r)^N/((1+r)^N-1)$ denotes the capital recovery factor for calculating the present value of an annuity; $C_{I\_CCHP}$ denotes investment cost of the CCHP units; $C_{I\_PV}$ denotes investment cost of the PV panels; $C_{I\_WT}$ denotes investment cost of wind turbines, $C_{I\_boiler}$ denotes investment cost of the natural gas boiler, $C_{I\_ice}$ denotes investment cost of the ice-storage air-conditioner; and $C_{I\_ordinary}$ denotes investment cost of ordinary air-conditioners; and wherein, the investment cost of the CCHP units can be expressed as:

$$C_{I\_CCHP} = c_{I\_CCHP} \times N_{CCHP} \quad (3)$$

wherein $c_{I\_CCHP}$ denotes investment cost for a single CCHP unit and $N_{CCHP}$ denotes the number of the CCHP units.

The investment cost of the CCHP units $C_{N\_G}$ can be expressed as:

$$C_{N\_G} = pr_{N\_G} \times \sum_{t=1}^{8760} \left( \frac{P_{CCHP}(t)}{\eta_{CCHP} \times LHV} + \frac{Q_{boiler}(t)}{\eta_{boiler} \times LHV} \right) \quad (4)$$

wherein $pr_{N\_G}$ denotes the price for natural gas, t is the index of the hour within one year; $P_{CCHP}(t)$ denotes the power of the CCHP units in the t-th hour; $\eta_{CCHP}$ denotes the efficiency of the CCHP units; $Q_{boiler}(t)$ denotes power of the natural gas boiler in the t-th hour; $\eta_{boiler}$ denotes the efficiency of the natural gas boiler; LHV denotes the lower heat valve of the natural gas;

The annual cost of buying the electricity from the macro grid $C_{Exch\_E}$ may be determined as $$C_{Exch\_E} = \sum_{t=1}^{8760} pr_E(t) \times P_{Exch\_E}(t) \quad (5)$$

wherein t is the index of the hour within one year; $pr_{E(t)}$ denotes the price for electricity in the t-th hour; and $P_{Exch\_E}(t)$ denotes the amount of the electricity exchanged in the t-th hour.

The annual pollutant emission treatment cost $C_{emiss}$ may be determined as $$C_{emiss} = Penalty_{CO2} \times \sum_{t=1}^{8760} (P_{CCHP}(t) \times Emiss_{CCHP\_CO2} + \quad (6)$$

$$P_{Exch\_E}(t) \times Emiss_{MG\_CO2} + Q_{boiler}(t) \times Emiss_{boiler\_CO2}) +$$

$$Penalty_{SO2} \times \sum_{t=1}^{8760} (P_{CCHP}(t) \times Emiss_{CCHP\_SO2} +$$

$$P_{Exch\_E}(t) \times Emiss_{MG\_SO2} + Q_{boiler}(t) \times Emiss_{boiler\_SO2}) +$$

$$Penalty_{NOx} \times \sum_{t=1}^{8760} (P_{CCHP}(t) \times Emiss_{CCHP\_NOx} +$$

$$P_{Exch\_E}(t) \times Emiss_{MG\_NOx} + Q_{boiler}(t) \times Emiss_{boiler\_NOx})$$

wherein $Penalty_{CO2}$, $Penalty_{SO2}$, and $Penalty_{NOX}$ respectively denotes penalties of $CO_2$ emission, $SO_2$ emission and $NO_X$ emission per unit; $P_{CCHP}(t)$ denotes the power of the CCHP units in the t-th hour; $P_{Exch\_E}(t)$ denotes amount of the electricity exchanged in the t-th hour; $Q_{boiler}(t)$ denotes power of the natural gas boiler in the t-th hour; $Emiss_{CCHP\_CO2}$, $Emiss_{CCHP\_SO2}$, $Emiss_{CCHP\_NO}$, denotes $CO_2$ Emission, $SO_2$ emission, and $NO_X$ emission of the CCHP units per unit power, respectively; $Emiss_{MG\_CO2}$, $Emiss_{MG\_SO2}$, $Emiss_{MG\_NOX}$, denotes $CO_2$ Emission, $SO_2$ emission, and $NO_X$ emission of the micro grid per unit power, respectively; $Emiss_{boiler\_CO2}$, $Emiss_{boiler\_SO2}$, $Emiss_{boiler\_NOX}$ denotes $CO_2$ Emission, $SO_2$ emission, and $NO_X$ emission of the natural gas boiler per unit power, respectively.

The annual cost of operation dependent maintenance $C_{O\&M}$, can be expressed as $$C_{O\&M} = c_{O\&M\_CCHP} \times \sum_{t=1}^{8760} P_{CCHP}(t) + \quad (7)$$

$$c_{O\&M\_PV} \times \sum_{t=1}^{8760} P_{PV}(t) + c_{O\&M\_WT} \times \sum_{t=1}^{8760} P_{WT}(t) +$$

$$c_{O\&M\_air\_c} \times \sum_{t=1}^{8760} (Q_{ice\_air}(t) + Q_{normal\_air}(t)) +$$

$$c_{O\&M\_ice} \times \sum_{t=1}^{8760} \eta_c Q_{icemaking}(t) + c_{O\&M\_boiler} \times \sum_{t=1}^{8760} Q_{boiler}(t)$$

wherein $c_{O\&M\_CCHP}$, $c_{O\&M\_PV}$, $c_{O\&M\_WT}$, $c_{O\&M\_air\_c}$, $c_{O\&M\_ice}$ and $c_{O\&M\_boiler}$ respectively denotes unit cost for CCHP operation related maintenance, PV panel operation related maintenance, wind turbines operation related maintenance, air conditioner operation related maintenance, ice-making operation related maintenance, boiler operation related maintenance; t is the index of the hour within one year; $P_{CCHP}(t)$ denotes the output power by the CCHP units in the t-th hour; $P_{PV}(t)$ denotes the output power from solar power generators in the t-th hour; $P_{WT}(t)$ denotes the output power from wind power generators in the t-th hour; $Q_{ice\_air}(t)$ denotes cooling power output by the ice-storage air conditioner in the t-th hour; $Q_{normal\_air}(t)$ denotes cooling power output by the normal air conditioner during in the t-th hour; $\eta_c$ denotes the efficiency of the ice-making of the ice-storage air-conditioner; $Q_{icemaking}(t)$ denotes cooling power output during the ice-making of the ice-storage air-conditioner; and $Q_{boiler}(t)$ denotes heat power output by the natural gas boiler in the t-th hour.

The second MG reliability objective, which is to minimize the energy outage cost, can also be formulated in many manners; however only for a purpose of illustration, an exemplary objective will be given as follows:

$$f_2 = \sum_{t=1}^{8760} \left( \sum_m \alpha_m P_{m,cut}(t) k_{GDP} + \sum_n \beta_n Q_{n,cut}(t) k_{GDP} \right) \quad (8)$$

Wherein
t is the index of the hour within one year;
m denotes the class of unsatisfied electricity loads, wherein m=1, 2, 3, 4 and respectively represents four classes of electricity load, i.e. 1) extremely important, 2) important, 3) disptachable within the day, and 4) cuttable;
$\alpha_m$ denotes the penalty for failing satisfying the electricity loads of class m;
$P_{m,cut}(t)$ denotes unsatisfied electricity of class m,
n denotes the class of unsatisfied thermal (cooling or heat) loads, wherein n=1, 2 and respectively represents two classes of thermal loads, i.e. 1) important and 2) cuttable;
$Q_{n,cut}(t)$ denotes unsatisfied thermal (cooling or heat) loads of class n,
βn denotes the penalty for failing satisfying the thermal loads of class n;

$k_{GDP}$ is the ratio of GDP to electric energy generation of a year at the location of the MG.

In the above capacity determination optimization problem, the period to be considered may be, for example, one year, i.e., 365 days, and the time granularity or time interval may be one hour. However, the skilled in the art should appreciate that the present disclosure is not limited thereto, it may also use any shorter or longer suitable time period and the time interval, such as half hour, 2 hours, and etc.

Next, constraints for the optimal capacity determination model will be described.

In an embodiment of the present disclosure, the constraints may comprise constraints on electricity supply/demand balance and thermal energy supply/demand balance, and operation constraints on the multi-type energy supply devices.

The constraint on thermal energy supply/demand balance may further include a constraint on the cooling energy supply/demand balance and a constraint on the heating energy supply/demand balance. Besides, in the micro grid, there are the CCHP unit and the ice-storage air-conditioner. All these devices have their own operation constraints. Thus, in the optimal capacity determination model, the operation constraints on the multi-type energy supply devices comprise operation constrains on the CCHP unit and the ice-storage air-conditioner. The operation constraint on the CCHP unit may include for example, at least one of: an electricity output efficiency model for the CCHP unit; an electricity output and cooling output relationship model for the CCHP unit; and relationship between consumed gas volume and the electricity output and the electricity output efficiency of the CCHP unit. Furthermore, as is well known, the ice-storage air-condition can work in different modes and thus its operation constraints may include at least one of an operation model of the ice-storage air-conditioner in air-conditioning mode, an operation model of the ice-storage air-conditioner in ice-making mode, an operation model of the ice-storage air-conditioner in ice-melting mode, an operation model of the ice-storage air-conditioner in ice-melting & air-conditioning mode, and an operation model of ice-storage tank of the ice-storage air-conditioner.

In addition, the optimal capacity determination may further comprise additional constraints. For example, to ensure the utilization efficiency of the renewable energy devices, the constraints may further include annual utilization limit of renewable energy; annual discard limit of the renewable energy. Further, the constraints may also include upper and/or lower limits for the respective numbers or energy supply capacity of the multi-type energy supply devices. Moreover, it may further limit the electricity exchanged between the micro grid and the macro grid which the micro-grid can be connected.

In the following text, only for a purpose of illustration, exemplary constraints for the capacity determination optimization model are listed as follows:
1) Electricity Supply/Demand Balance The Electricity Supply/Demand Balance requirement can be expressed by the following equation:

$$P_{Exch\_E}(t) + P_{PV}(t) + P_{WT}(t) + P_{CCHP}(t) + P_{batt}(t) = \quad (9)$$
$$P_L(t) - P_{out}(t) + P_{in}(t) + P_{ice\_air\_c}(t) + P_{normal\_air\_c}(t) +$$
$$P_{icemaking}(t) + P_{icemelting}(t) - \sum_m P_{m,cut}(t), t = 1, \ldots, 8760$$

wherein $P_{Exch\_E}(t)$ denotes the exchanged power between micro grid and the macro-grid in the t-th hour;

$P_{PV}(t)$ denotes the output electricity from solar power generators in the t-th hour;

$P_{WT}(t)$ denotes the output electricity from wind power generators in the t-th hour;

$P_{CCHP}(t)$ denotes the output electricity by the CCHP units in the t-th hour;

$P_{battery}(t)$ denotes the electricity provided by the storage battery in the t-th hour;

$P_L(t)$ denotes the electric load or the electricity demand in the t-th hour;

$P_{out}(t)$ and $P_{in}(t)$ denote the electricity the shift-in and shift-out dispatchable electricity load determined based on the load shifting strategies in the t-th hour and wherein $P_{out}(t)=0$ if $P_{in}(t)>0$ and $P_{in}(t)=0$ if $P_{out}(t)>0$;

$P_{ice\_air\_c}(t)$ denotes the electricity consumed by the ice-storage air conditioner during providing thermal energy in the t-th hour;

$P_{normal\_air\_c}(t)$ denotes the electricity consumed by the normal air conditioner in the t-th hour;

$P_{icemaking}(t)$ denotes the electricity consumed by the ice-storage air conditioner during ice making in the t-th hour;

$P_{icemelting}(t)$ denotes the electricity consumed by the ice-storage air conditioner during ice melting in the t-th hour; and $P_{m,cut}(t)$ denotes the unsatisfied electricity of class m as described hereinabove.

2) Thermal Energy Supply/Demand Balance:

The thermal energy supply/demand balance may include the cooling energy supply/demand balance and the heating energy supply/demand balance, which can be respectively expressed by:

$$Q_{CCHP\_H}(t) + Q_{boiler}(t) = Q_{L\_H}(t) - \sum_n Q_{n,cut}(t), t = 1, \ldots, 8760 \quad (10)$$

$$Q_{CCHP\_C}(t) + Q_{ice\_air\_c}(t) + Q_{normal\_air\_c}(t) + Q_{icemelting}(t) = \quad (11)$$
$$Q_{L\_C}(t) - \sum_n Q_{n,cut}(t), t = 1, \ldots, 8760$$

wherein $Q_{CCHP\_H}(t)$ denotes heat power output by the CCHP units in the t-th hour;

$Q_{boiler}(t)$ denotes heat power output by the natural gas boiler in the t-th hour;

$Q_{L\_H}(t)$ denotes heat power demand in the t-th hour;

$Q_{m,cut}(t)$ denotes unsatisfied heat power of class m in the t-th hour;

$Q_{CCHP\_C}(t)$ denotes cooling power output by the CCHP units in the t-th hour;

$Q_{ice\_air\_c}(t)$ denotes cooling power output by the ice-storage air conditioner in the t-th hour;

$Q_{normal\_air\_c}(t)$ denotes cooling power output by the normal air conditioner during in the t-th hour;

$Q_{icemelting}(t)$ denotes cooling power output during the ice-melting of the ice-storage air conditioner in the t-th hour;

$Q_{L\_c}(t)$ denotes cooling power demand in the t-th hour;

$Q_{n,cut}(t)$ denotes unsatisfied cooling power of class n in the t-th hour.

3) Micro Grid Components Operational Constraints

Operational constraints on the multi-type energy supply devices may include:

Operation constraints for the CCHP units, such as those given in the following equations (25 to 33).

Operation constraints for the ice-storage air-conditioner, such as those given in the following equations (34) to (48).

These two constraints will be described hereinafter and thus will be elaborated herein.

4) Micro Grid Operation Constraints

Renewable energy utilization constraint

In order to ensure the renewable energy has an acceptable utilization ratio, the yearly renewable energy utilization ratio may be constrained to be higher than a predetermined threshold. The ratio of yearly renewable energy utilization to the total electric demand may be expressed by $$\frac{\sum_{t=1}^{8760} P_{PV}(t) + P_{WT}(t)}{\sum_{t=1}^{8760} P_L(t)} \quad (12)$$

wherein $P_{PV}(t)$ denotes the output electricity from solar power generators in the t-th hour;

$P_{WT}(t)$ denotes the output electricity from wind power generators in the t-th hour;

$P_L(t)$ denotes the electric load or the electricity demand in the t-th hour;

Thus, the renewable energy utilization constraint can be expressed as $$\frac{\sum_{t=1}^{8760} P_{PV}(t) + P_{WT}(t)}{\sum_{t=1}^{8760} P_L(t)} > L_{RN\_Uti} \quad (13)$$

Wherein $L_{RN\_Uti}$ is the threshold for renewable energy utilization ratio, which may be for example 0.3.

Renewable energy discard constraint

On the other hand, to ensure the sufficient utilization of the generated renewable energy, yearly renewable energy discard ratio should be limited. The ratio of yearly discarded renewable energy to the total available renewable energy may be expressed by $$C\_Renew = 1 - \frac{\sum_{t=1}^{8760} P_{PV}(t) + P_{WT}(t)}{\sum_{t=1}^{8760} P_{Avail\_PV}(t) + P_{Avail\_WT}(t)}$$

$P_{PV}(t)$ denotes the output electricity from solar power generators in the t-th hour;

$P_{WT}(t)$ denotes the output electricity from wind power generators in the t-th hour;

$P_{Avail\_PV}(t)$ denotes the available electricity from solar power generators in the t-th hour;

$P_{Avail\_WT}(t)$ denotes the available electricity from wind power generators in the t-th hour;

Thus, the renewable energy discard constraint may be expressed by $$1 - \frac{\sum_{t=1}^{8760} P_{PV}(t) + P_{WT}(t)}{\sum_{t=1}^{8760} P_{Avail\_PV}(t) + P_{Avail\_WT}(t)} <= L_{RN\_Disc} \quad (14)$$

wherein $L_{RN\_Dis}$ is the threshold for renewable energy discard constraint, which may be for example 1%.

5) Variable or Parameter Constraints

Variable or parameter constraints which can be used in the present disclosure include those limits for $N_{CCHP}$, $N_{PV}$, $N_{WT}$, $Q_{ordinary}$, $Q_{ice}$, $Q_{boiler}$, $C_{tank}$, which may be expressed by $$N_{CCHP\_min} \leq N_{CCHP} \leq N_{CCHP\_max} \quad (15)$$

$$N_{PVserial\_min} \leq N_{PVserial} \leq N_{PVserial\_max} \quad (16)$$

$$N_{WT\_min} \leq N_{WT} \leq N_{WT\_max} \quad (17)$$

$$Q_{ice\_air\_min} \leq Q_{ice} \leq Q_{ice\_air\_max} \quad (18)$$

$$Q_{boiler\_min} \leq Q_{boiler} \leq Q_{boiler\_max} \quad (19)$$

$$p_{min} \times P_{Exch\_max} <= P_{Exch\_E}(t) <= P_{Exch\_max} \quad (20)$$

It should be appreciated that, although the specific constraints for the example capacity determination optimization model have been described, the present disclosure is not limited thereto. Actually, from the teaching provided therein, the skilled in the art may conceive many other modifications, for example, modifying some of the constraints; omitting some of the constraints and adding some new constraints without departing from the spirit of the present disclosure.

In addition, as mentioned hereinabove, the micro grid includes multi-type energy supply devices and these energy supply devices should comply with their own physical and operational constraints, especially for the CCHP units and the ice-storage air-conditioner. Hereinafter, exemplary models for the CCHP unit and the ice-storage air-conditioner will be given only for a purpose of illustration.

Micro Grid Components Modeling

I. CCHP Unit Modeling

Hereinafter, for a purpose of illustration, micro-turbine Capstone C200, which is known in the art, will be taken as an example CCHP unit contained in the micro grid, to explain embodiments of the present disclosure.

I-1. Electricity Output Efficiency Modeling

Generally, the electricity out efficiency of a CCHP unit is function of the electricity output of the CCHP unit, and thus the electricity output efficiency of the CCHP unit may be simply expressed as follows:

$$E_{CHP}(t) = f(P_{CHP}(t)) \quad (21)$$

wherein, $E_{CHP}(t)$ denotes the CCHP unit's electricity output efficiency at given time t; and $P_{CHP}(t)$ is CCHP unit's electricity output at given time t.

Additionally, in the manufacturer's documents, there is usually given the nominal output power $P_{ISO-max}$ under a standard working condition (named ISO condition) and full-load state. However, the CCHP output will vary as the ambient elevation H and temperature T change, which means its performance under non-ISO conditions and partial-load state should be taken into account as well if it is desired to determine the electricity output efficiency more accurately.

In C200 documents, there are provided many parameters or measurements which may be used for the electricity output modeling. Based on these parameters or measurements, the following models may be established one by one:

Influence of the ambient elevation H and temperature T on the maximum output power $P_{A-max}$. In the C200 documents, there are provided a plurality of measurements at different ambient elevation H and different temperature T, based on these measurements, it may determine a specific relationship between the maximum output power and the ambient elevation H and temperature T by, for example, piecewise linear fitting, the relationship may be represented as below:

$$P_{A-max} = f_1(H,T); \quad (22)$$

Function between the full-load efficiency $E_{A-max}$ and temperature T Similarly, based on those measurements at different temperatures, the following function may be obtained by, for example, a cubic polynomial fitting;

$$E_{A-max} = f_2(T); \quad (23)$$

Power correction factors and efficiency correction factors for full-load state under ISO condition.

Power output and efficiency are usually affected by inlet pressure loss I_p_loss and back pressure B_p of the CCHP unit. Based on measurements on power output and efficiency at different inlet pressure loss and back pressure as provided in C200 documents, it may determine the power correction factors and efficiency correction factors for inlet pressure loss I_p_loss and back pressure B_p respectively, which may be denoted by $P\_CF_{I\_P}$, $E\_CF_{I\_P}$, $E\_CF_{B\_P}$ respectively. The power correction factors and efficiency correction factors are all in a linearity relationship with inlet pressure loss I_p_loss and back pressure B_p of the CCHP unit. Additionally, these two parameters inlet pressure loss I_p_loss and back pressure B_p may be determined once the CCHP unit is installed;

Additionally, based on the measurements on power output and efficiency in full-load condition given in those documents, partial-load performance model under ISO condition may be obtained by means of curve fitting as follows:

$$E_{ISO} = f_{ISO}\left(\frac{P_{ISO\_part}}{P_{ISO\_max}}\right). \quad (24)$$

wherein the functions $f_1$, $f_2$, $f_{ISO}$, $f$ are all nonlinear function.

Finally, based on the above equations (2) to (4) and these power and efficiency correction factors $P\_CF_{I\_P}$, $E\_CF_{I\_P}$, $P\_CF_{B\_P}$, $E\_CF_{B\_P}$, it may derive the CCHP partial-load performance under a given operation condition as follows:

$$E_{CHP}(t) = f(P_{CHP}(t)) = f_{ISO}\left(\frac{P_{CHP}(t)}{P_{ISO-max}}\right) \times \frac{E_{max}}{f_{ISO}\left(\frac{P_{max}}{P_{ISO-max}}\right)}, \quad (25)$$

where $P_{max}$ and $E_{max}$ are the maximum efficiency and the maximum output power under a given working condition respectively. The $P_{max}$ and $E_{max}$ may be obtained through correcting, by means of the above-mentioned power and efficiency correction factors, $P_{A\text{-}max}$ and $E_{A\text{-}max}$, which respectively denote the maximum efficiency and output power under the given working condition without considering effects induced by inlet pressure loss I_p_loss and back pressure B.

That is to say, the maximum efficiency and output power under the given working condition may be corrected by those correction factors so as to consider effects induced by inlet pressure loss I_p_loss and back pressure B. For example, $P_{max}$ and $E_{max}$ may be expressed as:

$$P_{max} = P_{A\text{-}max} * P\_CF_{I\_P} * P\_CF_{B\_P},$$
$$E_{max} = E_{A\text{-}max} * P\_CF_{I\_P} * P\_CF_{B\_P}. \quad (26)$$

However, it can be appreciated that the present disclosure is not limited to the embodiment in which the parameters $P_{max}$ and $E_{max}$ are corrected by these correction factors for the inlet pressure loss and back pressure of the CCHP unit and it is also possible if the $P_{max}$ and $E_{max}$ are not corrected.

Further, the model may further include relationship between the consumed gas volume, the electricity output and electricity output efficiency. If the lower heating value of natural gas, denoted by $\eta_{CHP}$, is known, gas volume F(t) consumed by a CCHP unit may be determined as $$F(t) = P_{CHP}(t)/E_{CHP}(t)/\eta_{CHP}. \quad (27)$$

Generally, the electricity output $P_{CHP}(t)$ has an upper bound, i.e. the maximum electricity. In addition, to avoid lower efficiency, the CCHP unit's electricity output $P_{CHP}(t)$ may preferably have a lower bound constraint. Thus, by combing with the lower and upper bound constraints, it may obtain $$I_{CHP}(t)P_{min} \leq P_{CHP}(t) \leq P_{max}I_{CHP}(t). \quad (28)$$

wherein $I_{CHP}(t)$ is 0-1 variable denoting whether the CCHP unit operates or not. The $P_{min}$ may be, for example, $0.2*P_{max}$.

It is also noted that in some countries or areas, it will be more cost efficient to buy electricity from the macro-grid then running CCHP units with natural gas in some time intervals. For example, in China, for most of the commercial and industrial customer, the electricity price in valley period is about 0.3 RMB/kwh and the natural gas price is always 2 RMB/m3. The natural gas price with the same economic cost as buying electricity from macro-grid is about 1.90 RMB/m3 ($\eta_{CHP}$=10 kWh/m3), which means that, during valley period, it is much cheaper to buy the electricity from macro-grid than running CCHP units. Thus, it will be preferable if the operation of the CCHP units may be restrained to only the off-valley time, i.e., it may have the following constraint $$I_{CHP}(t) = 0, \ t \in T_{valley} \quad (29)$$

However, it should be noted, for other areas and counties which employ different pricing policy, the constraint as defined in equation (9) may be modified accordingly or even be omitted.

I-2. Modeling of Electricity Output vs Cooling Output

Generally, cooling output $Q_{CHP}(t)$ of the CCHP is closely related to exhaust characteristics, such as the exhaust temperature E_T(t) and exhaust flow velocity E_V(t). Based on the measurements on power output at different exhaust temperature and exhaust flow velocity, which may respectively represent by the functions by means of quadratic polynomial fitting and piecewise linear fitting respectively:

$$E\_T(t) = g_1(T, P_{CHP}(t)) \text{ and } E\_V(t) = g_2(T, P_{CHP}(t)) \quad (30)$$

Thus, it may obtain the following relationship between the cooling output $Q_{CHP}(t)$ and electricity power $P_{CHP}(t)$ under a given working condition:

$$Q_{CHP}(t) = g(P_{CHP}(t)). \quad (31)$$

wherein $Q_{CHP}(t)$ is cooling output of the CCHP unit at given time t; and $P_{CHP}(t)$ is electricity output of the CCHP unit at given time t.

When the CCHP unit works at the mode wherein the cooling energy output is determined based on the $P_{CHP}(t)$, the corresponding $Q_{CHP}(t)$ can be derived by Eq. (10). On the contrary, when the CCHP unit works at the mode wherein the power generation is determined based on the cooling demand, the corresponding output power $P_{CHP}(t)$ may be given by $$P_{CHP}(t) = g^{-1}(Q_{CHP}(t)). \quad (32)$$

Furthermore, the following constraints might be placed on the cooling output $Q_{CHP}(t)$ so as to avoid a low efficiency:

$$I_{CHP}(t)Q_{min} \leq Q_{CHP}(t) \leq I_{CHP}(t)Q_{max} \quad (33)$$

wherein $Q_{min} = g(P_{min})$ and $Q_{max} = g(P_{max})$.

Besides, it may be appreciated that during start/stop operation, the above-relationships may be different to those operation states. For Capstone C200, relevant tests show that the CCHP unit possesses rapid dynamic responses in start, stop and output adjustment. For example, during the start operation, the cost time is about 120 s from initiation to full-load state; the whole stop process consumes less than 200 s; and the output adjustment following load change can finish approximately in 80 s. In view of this, it seems that constraints on start/stop operation and ramping up/down may be ignored in the day-ahead scheduling.

Although in the above description, the constraints on start/stop operation and ramping up/down are suggested to be ignored, it should be appreciated that, if desired, the constraints on start/stop operation and ramping up/down may also be considered.

II. Ice-storage Air-conditioner Modeling

An ice storage air-conditioner usually contains an ice chiller, a cooling tower, an ice-storage tank, pump and other auxiliary equipments, and the ice-storage air-conditioners may work in different operation modes. For example, when consuming electricity to provide the cooling energy to the customer or when converting the electricity energy into the cooling energy stored in the form of ice, it could work as an electricity load, while it may work as a cooling energy generator to release the energy stored in the ice back to the air so as to provide the cooling energy to the customers.

In view of this, herein, it will establish mathematic models for the following four operation modes, 1) Air-conditioning mode, in which only an ice chiller works to satisfy the cooling demand;
2) Ice-making mode, in which the ice chiller stores cooling capacity by making ice, preferably during off-peak period;
3) Ice melting mode, in which the ice-storage tank performs ice melting to meet cooling demand; and
4) Ice melting & air-conditioning mode, in which ice melting by ice-storage tank and air-conditioning by the ice chiller are combined together.

That is to say, the models for the four operation modes will define the cooling output as a function of its inputs (namely, the electricity energy, or cooling energy stored in form of ice) of ice-storage air-conditioner under 4 operation modes.

In addition, the ice-storage tank is an important device in the ice-storage air conditioner and it may be required to be modeled to establish an accurate model.

Hereinafter, the air-conditioning mode may be denoted by $I_a(t) \in (0,1)$; the ice-making mode may be denoted by $I_c(t) \in (0,1)$; the ice melting mode may be denoted by $I_d(t) \in (0,1)$; and the ice melting & air-conditioning mode is regarded as a combination of the ice melting mode and the air-conditioning modem, wherein, if the ice-storage air conditioner operates in a operation mode, the value of the corresponding variable $I_a(t)$, $I_c(t)$ and $I_d(t)$ will be 1, otherwise, the value will be 0; and if both values of $I_a(t)$ and $I_d(t)$ are 1, it denotes the ice-storage air conditioner operates in the ice melting & air-conditioning mode. Next, detailed description will be provided of the models for the ice storage air-conditioner in the four operation modes.

II-1. Air-conditioning Mode:

In the air-conditioning mode, the ice chiller will run within its rated capacity to provide cooling energy as much as possible. On the other hand, for higher efficiency, the ice chiller may avoid running at lower load ratios, which means it may impose a constraint as follows:

$$I_a(t)Q_{a-min} \leq Q_a(t) \leq I_a(t)Q_{a-max}, \quad (34)$$

where $Q_a(t)$, $Q_{a-min}$ and $Q_{a-max}$ denote the output cooling power at the time t, and the minimal and maximum cooling power of ice chiller in air-conditioning mode, respectively. $Q_{a-min}$ is defined as for example 20% of $Q_{a-max}$.

When $Q_a(t)$ falls within the constraints as given (14), the COP (coefficient of performance) varies linearly with $Q_a(t)$. Therefore, partial load model of the ice chiller may be derived by curve fitting method and represented for example as follows:

$$P_a(t) = \frac{Q_a(t)}{a_1 * Q_a(t) + a_2}, \quad (35)$$

wherein $P_a(t)$ is consumed electricity power and $a_i(i=1,2)$ represent coefficients of linear fitting to data provided by the manufacturer of the ice-storage air conditioner.

In addition, a normal air-conditioner with a smaller capacity is usually equipped to meet the cooling demand in valley periods because the ice chiller often runs in ice-making mode during valley periods, and the ice-making and ice-conditioning mode is not recommended to occur simultaneously for a purpose of economic operation. Therefore, it may further obtain the following constraints.

$$I_a(t)=0, \ t \in T_{valley}. \quad (36)$$

II-2. Ice-making Mode:

In the ice-making mode, the ice chiller usually operates at its maximum cooling $Q_{a-max}$ to pursue a larger COP, i.e. the cooling energy as made may be expressed as:

$$Q_c(t)=I_c(t)Q_{a-max} \quad (37)$$

In such a case, the operation of ice-making mode can also be described as $$P_c(t) = \frac{Q_c(t)}{a_3 * Q_c(t) + a_4}, \quad (38)$$

wherein $P_c(t)$ is the electricity consumption and $a_i(i=3,4)$ represent coefficients of linear fitting to data provided by the manufacturer of the ice-storage air conditioner.

In addition, for a purpose of economic operation, the ice-making mode should continuously run in valley period. Therefore, it may further have the following constraints:

$$\begin{cases} \sum_{t=1}^{T-1} |I_c(t+1) - I_c(t)| = 2 \\ I_c(t) = 0, \ t \notin T_{valley} \end{cases} \quad (39)$$

II-3. Ice-melting Mode:

Generally, for the ice-melting mode, it may limit its operation only in off-valley periods for the economic operation. That is to say, the following constraint may be obtained.

$$I_d(t)=0, \ t \in T_{valley}. \quad (40)$$

On the other hand, when the ice-storage tank implements ice melting to provide the cooling energy $Q_d(t)$, the power consumption $P_d(t)$ is a very small constant while the cooling energy $Q_d(t)$ should satisfy constraints for its bound.

$$0 \leq Q_d(t) \leq I_d(t)*Q_{d-max} \quad (41)$$

wherein $Q_{d-max}$ is defined as for example 20% of $IS_{max}$ and $IS_{max}$ is the maximum capacity of the ice-storage tank.

II-4. Combined Ice-melting & Air-conditioning Mode

As mentioned hereinbefore, the ice melting & air-conditioning mode may be regarded as a combination of the ice melting mode and the air-conditioning mode and thus its model is the combination thereof, i.e., equations (34) to (36) and equations (20) to (21). Thus, detailed description about the model under the ice melting & air-conditioning mode will be omitted for a purpose of simplicity.

II-5. Model for the Ice-storage Tank

In addition, the ice-storage tank is may be modeled by considering the dissipation coefficient, the refrigeration efficiency and the maximum storage capacity $IS_{max}$. The cooling energy $IS(T)$ stored in the ice-storage tank at time T may be written as follows:

$$IS(T)=(1-\eta_1)IS(T-1)+\eta_2 Q_c(T)-Q_d(T), \quad (42)$$

where $\eta_1$ is the dissipation coefficient of stored cooling energy, which is chosen to be 0.2; and $\eta_2$ is refrigeration coefficient, which may equal to be 0.67.

Additionally, at each off-valley time T, to meet the total gap between the cooling demand and the maximum available cooling supply that may be provided by the CCHP units and air-conditioning mode for the following off-valley times after T, the minimal required cooling energy storage $IS_{min}(T)$ in the tank may be defined as $$IS_{min}(T) = \sum_{\substack{tt \notin T_{valley} \\ tt >= T}} Q_{Gap}(tt), \ T \notin T_{valley}, \quad (43)$$

where $Q_{Gap}(t)$ denotes the gap between the cooling demand and the maximum available cooling supply provided by the CCHP units and air-conditioning mode and it may be expressed by:

$$Q_{Gap}(tt) = \begin{cases} Q_{load}(tt) - Q_{max} - Q_{a-max}, & \text{if } Q_{load}(tt) - Q_{max} - Q_{a-max} > 0 \\ 0 & \text{other} \end{cases}.$$

Then, it may obtain the following constraints $$IS(T) \geq IS_{min}(T), T \notin T_{valley} \quad (44)$$

Considering that, during the valley periods, the ambient temperature is lower and ice-making continuously run, dissipation of ice-storage tank can be omitted. Thus, at the end of valley time $T_{end\_valley}$, the stored cooling capacity $IS(T_{end\_valley})$ is $$IS(T_{end\_valley}) = T_c \eta_2 Q_{a-max}, \quad (45)$$

where $T_c$ is the duration of continuous ice-making mode in hour. According to Eq. (38), it holds $$T_c \geq IS_{min}(T_{end\_valley})/(\eta_2 Q_{a-max}). \quad (46)$$

In addition, there may also exists the upper bound constraint for $T_c$, i.e.

$$T_c \leq \min(IS_{max}/(\eta_2 Q_{a-max}), L_{valley}) \quad (47)$$

where $L_{valley}$ is the duration of valley periods in hour. Also, $IS(T)$ ($T \notin T_{valley}$) may have an upper bound constraint as below:

$$IS(T) \leq (1-\eta_1)IS(T-1), T \notin T_{valley} \quad (48)$$

Hereinbefore, the example models for the CCHP units and the ice-storage are described in details; however, the skilled in the art should be appreciated that the present disclosure is not limited thereto and it is also possible to use any other suitable models.

In the capacity determination optimization model of the MG, in addition to the decisive variables, $N_{CCHP}$, $N_{PV}$, $N_{WT}$, $Q_{ice}$, $Q_{boiler}$, $C_{tank}$ there are further unknown variables of operation status of CCHP units, ice-storage air-conditioners, boilers, PVs and wind turbines at each hour of a year. If all these variables are solved together, it will be challenging (although not impossible) to find a solution for the optimization process facing so many variables to be determined. Therefore, herein, a micro grid optimal operation strategy for the multi-type energy supply is provided for simplifying the solving of the optimal capacity determination.

During studying the objectives and constraints of the optimal capacity planning model, the inventors observe that the annualized investment cost and the upper and lower constraints of decisive variables, other objectives and constraints are closely related to the optimal MG schedule. Moreover, some variables related to the ice-making and ice-melting, and those related to the storage battery schedule before planned island scenario can be considered on a day time scale. In view of this, there is proposed an MG optimal energy scheduling process for the multi-type energy supply and multi-operation scenario on day time scale which can be imbedded it into the MG capacity determination model.

The main idea of the MG optimal energy scheduling process is to determine, based on the matching relationship between the thermal (cooling/heating) energy demand and the electricity demand and different MG operation scenarios, the operation priority of the various energy supply devices as well as the CCHP units' working mode, with the aim of minimizing the integrated cost (including for example, costs of device investment, operation, maintenance, treatment of emitted pollutant) and the energy outage cost penalty of energy outage while satisfying the multi-energy supply/demand balances.

The matching relationship between the thermal (cooling/heating) energy demand and the electricity demand refers to ratio of the thermal (cooling/heating) energy demand to the electricity demand, which is particular used to determine the working mode of a CCHP unit. As is known, a CCHP unit may work in various operation modes. First, the CCHP unit may operate as a heating energy & electricity supply source by consuming fuel gas such a natural gas or a cooling energy & electricity supply source by consuming fuel gas such a natural gas. In addition, it may work either in an operation mode in which supplied heating/cooling energy is determined by electricity (i.e., following the electricity demand, referred to as FED) or an operation mode in which supplied electricity is determined by the heating/cooling energy (i.e., following the heating/cooling demand, referred to as FHD/FCD). If the ratio of the thermal (cooling/heating) energy demand to the electricity demand is matched with the ratio of thermal energy and electricity supplied by the CCHP unit, it will be desirable; otherwise, in the present disclosure, the operation mode will be selected based on the ratio of the thermal (cooling/heating) energy demand to the electricity demand so that there is no energy waste. For example, if the ratio of the thermal (cooling/heating) energy demand to the electricity demand is larger than the ratio of thermal energy and electricity supplied by the CCHP unit, the CCHP unit may work in the FED mode; otherwise, the CCHP unit may work in a FCD/FHD mode which is dependent on whether the thermal energy demand is cooling demand or heating demand.

In an embodiment of the present disclosure, the optimal energy scheduling process may be pre-performed by determining operation priorities of the multi-type energy supply devices and an operation mode of the CCHP unit at each time interval in a scheduling period based on matching relationship between thermal demand and electricity demand and operation scenarios of the micro grid with an aim of minimizing integrated cost and energy outage cost while keeping the electricity supply/demand balance and the thermal energy supply/demand balance.

In case where the thermal demand comprises both cooling energy demand and heating energy demand, the optimal energy scheduling process may comprise a heating & electricity coordinated daily schedule (HECDS) process and a cooling & electricity coordinated daily schedule (CECDS) process. The HECDS process may be configured to determine strategy of scheduling heating & electricity supply based on whether the micro-grid operates in a grid-connected mode or a planned island mode within each time interval of the scheduling period, and reschedule possibly unsatisfied electricity load to one or more other time interval of the scheduling period, and apply an unplanned island mode to a time interval if a unplanned island event occurs within this time interval. On the other hand, the CECDS process may be configured to determine a strategy of scheduling heating & electricity supply based on whether the micro-grid operates in a grid-connected mode or a planned island mode within each time interval of the scheduling period, determine the required continuous ice-making hours for a possible cooling demand gap, reschedule possible unsatisfied electricity load to one or more other time intervals in the scheduling period, and apply an unplanned island mode to a time interval if a unplanned island event occurs within this time interval.

As mentioned hereinbefore, the micro grid may work in three different modes, i.e., the grid-connected mode, the planned island mode and the unplanned island mode. In the grid-connected mode, the micro grid is connected to the macro grid and can exchange electricity with the macro grid. In the planned island mode, the micro grid is not connected to the macro grid and it is planned in advance and thus during scheduling in the day always, impact of the planned island mode has been considered. In the unplanned island mode, the micro-grid is not connected to the macro grid either but it happens unexpectedly, for example, when an unplanned island event (such as outage of the macro grid) occurs during the micro grid operates in the grid-connected mode. This means its impact should be considered temporarily.

In embodiments of the present disclosure, for different operation modes of the micro grid, both the HECDS process and the CECDS process have different strategies of scheduling energy supplies, which will be detailed next.

Particularly, for the HECDS process in the grid-connected mode, the electricity may be supplied in a priority order of the renewable energy supply device, the CCHP unit, and the macro grid, while the heating energy may be supplied in a priority order of the CCHP unit and the ordinary heating supply device. At the same time, the operation mode of the CCHP unit can be determined based on the matching relationship between the thermal demand and the electricity demand so as to save the energy. In the planned island mode, unlike the grid-connected mode, no electricity can be taken from the macro grid. Thus, the storage battery will be used when the electricity demand cannot be met and the CCHP unit works in a mode in which the supplied heating energy is determined by the electricity, instead of being determined based on matching relationship between thermal demand and electricity demand. Specifically, in the planned island mode, the electricity is supplied by and in a priority order of the renewable energy supply device, the CCHP unit and the storage battery, and the heating energy is supplied by and in a priority order of the CCHP unit and the ordinary heating supply device.

As mentioned hereinbefore, the unplanned island mode is similar to the planned island mode expect that impact of the unplanned island mode should be considered. Thus, in the unplanned island mode, the electricity load is adjusted based on scheduled shift-in and shift-out electricity load while the electricity supply priority and the heating supply priority can be identical to those in the planed island mode. That is to say, the electricity may be also supplied in an order of the renewable energy supply device, the CCHP unit and the storage battery and the heating energy may be supplied in a priority order of the CCHP unit and the ordinary heating supply device. Besides, similarly, the CCHP unit works in a mode in which the supplied heating energy is determined by the electricity.

Regarding the scheduling strategies for the CECDS process, they are different from those for HECDS process because the CECDS process involves both CCHP units and ice-storage air-conditioner.

For the CECDS process in the grid-connected mode, the electricity may be supplied by and in a priority order of the renewable energy, the CCHP unit and the macro grid, and the cooling energy is supplied by and in a priority order of remaining renewable energy after supplying electric loads, the CCHP unit while supplying the electric loads, the CCHP unit while driving the ice-storage air-conditioner, the macro grid for driving the ice-storage air-conditioner and the ordinary air-conditioner. Similarly to the HECDS in the grid-connected mode, the operation mode of the CCHP unit may be determined based on the matching relationship between the thermal demand and the electricity demand.

The CECDS in the planed island mode is similar to the CECDS in the grid-connected mode except that the storage battery will be used when the electricity demand cannot be met and the CCHP unit works in a mode in which supplied heating energy is determined by electricity. Particularly, in CECDS in the planned island mode, the electricity may be supplied in a priority order of the renewable energy, the CCHP unit and the battery storage, while the cooling energy may be supplied by and in a priority order of remaining renewable energy after supplying electric loads, the CCHP unit while supplying the electric loads, the CCHP unit while driving the ice-storage air-conditioner. At the same time the CCHP unit works in a mode in which the supplied heating energy is determined by the electricity and the battery storage is used when there is no electricity available for ice-making.

The CECDS in the unplanned island mode is similar to the CECDS in the planed island mode but impact of the unplanned island mode should be considered. Particularly, if the unplanned island mode occurs in the valley-time period during which it is supposed to do the ice-making, the stored cooling energy will be reduced and thus the reduced cooling energy should be rescheduled; if the unplanned is land mode occurs in the off-valley time, the ice-making will not be affected but the available ice-melting will be limited to the original scheduled value so as to ensure the electricity supply. Particularly, in the unplanned island mode, if it is in a valley-time, the reduced amount of stored cooling energy of the ice-storage air-conditioner will be rescheduled to one or more following time intervals; if it is off-valley time, the ice-melting of the ice-storage air-conditioner is limited to an original schedule value. Besides, the electricity is supplied by and in a priority order of the renewable energy, the CCHP unit and the battery storage, the cooling energy is supplied by and in the priority order of remaining renewable energy after supplying electric loads, the CCHP unit while supplying the electric loads, the CCHP unit while driving the ice-storage air-conditioner. At the same time, the CCHP unit works in a mode in which the heating energy is determined by the electricity and the battery storage is used when there is no electricity available for ice-making.

Hereinafter, to explain operations of optimal energy scheduling, exemplary optimal energy scheduling for determining micro grid optimal operation strategy will be described, only for a purpose of illustration, with reference to specific embodiments of the present disclosure.

Micro Grid Optimal Energy Scheduling Process for Multi-type Energy Supplies

In the embodiment of the present disclosure, the optimal energy scheduling process may include a heat & electricity coordinated daily schedule (HECDS) process and a cooling & electricity coordinated daily schedule (CECDS) process for the multi-operation scenario of grid-connected, planned islanded and unplanned islanded modes. Hereinafter, the HECDS process and the CECDS process will be described one by one.

Heat & Electricity Coordinated Daily Schedule (HECDS)

Figure 3:
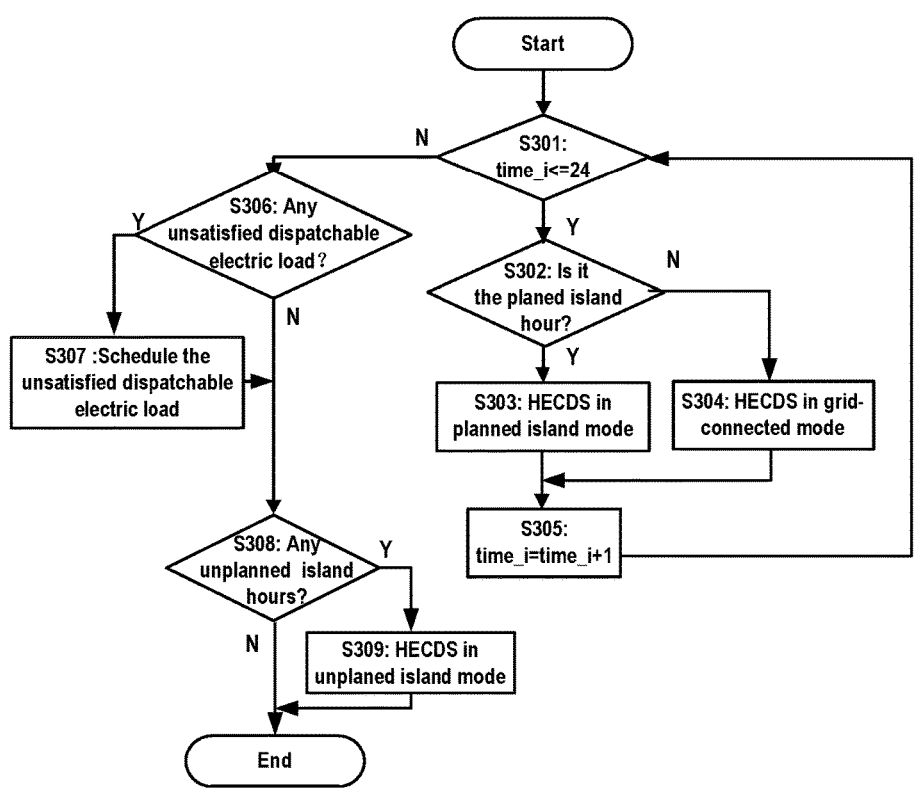
FIG. 3 schematically illustrates a flow chart of heat & electricity (H&E) coordinated daily schedule (HECDS) process according to an example embodiment of the present disclosure.

An example for the H&E coordinated daily schedule process is illustrated in FIG. 3. As illustrated in FIG. 3, first at step S301, it is checked whether the hour time_i belongs to an hour in the day. If yes, then at step S302, it is further checked if it is the time for the planed island mode. If so, at step S303, it is determined that the micro grid will use the HECDS in the planed island mode; otherwise at step S304, the micro grid will use the HECDS in grid-connected mode. Afterward, at step S305, the time index time_i is increased by 1 and the process enters another loop for the next hour. After the scheduling of all 24 hours of the day (no at step S301), at step S306, it is checked whether there is any unsatisfied dispatchable electricity load. If not, the step proceeds with step S308; otherwise, at step S307, the electric load may be scheduled to other hours of the day according to, for example, the priority of the electricity consuming price and the process goes to step S308. At step S308, it is further checked whether there is an unplanned island hour during the day. If yes, at step S309, the micro grid will use the HECDS in the unplanned island mode.

For the HECDS in the grid-connected mode, the renewable energy is given the highest priority for satisfying the electric load; then it is checked whether there exists surplus electricity supply if the CCHP units work in the FHD mode. If so, it is determined the CCHP units work in the FED mode; if not, the CCHP units can still work in the FHD mode. The remaining gap between the heat supply and the heat demand may be satisfied by the natural gas boiler.

For the HECDS process in the planed islanded mode, the electricity is satisfied according to the decreasing priority ranking of the renewable energy, CCHPs in the FED mode, and the storage battery. On the other hand, the heating energy provided by the CCHPs is used to meet the heat demand and the remaining gap between heat supply and demand is supplied by natural gas boiler.

For the HECDS process in the grid-connected mode or the planned islanded mode, after the scheduling of all 24 hours of a day, the unsatisfied dispatchable electricity demand will be scheduled to the other hours of the day according to the priority of electricity consuming price.

For the HECDS process in unplanned islanded mode, it is similar to that in planned island but the unplanned island operation usually occurs unexpectedly and before the unplanned island mode, the MG usually operates in the grid-connected mode. When the unplanned island event, such as outage in the macro grid, happens in an hour, the HECS process in unplanned island mode will be performed in this hour. Since the scheduling of the dispatchable electricity load on this day has been implemented, the actual electricity load at the unplanned island time should be adjusted according to the scheduled shift-in and shift-out electricity load at this time. After that, the same strategy as those for the HECDS in planned island may be applied in this hour. Besides, if there is unsatisfied dispatchable electric load in this hour, the unsatisfied electric load may be scheduled to the following hours according to the priority of electricity consuming price.

Cooling & Electricity (C&E) Coordinated Schedule (CECDS)

Figure 4:
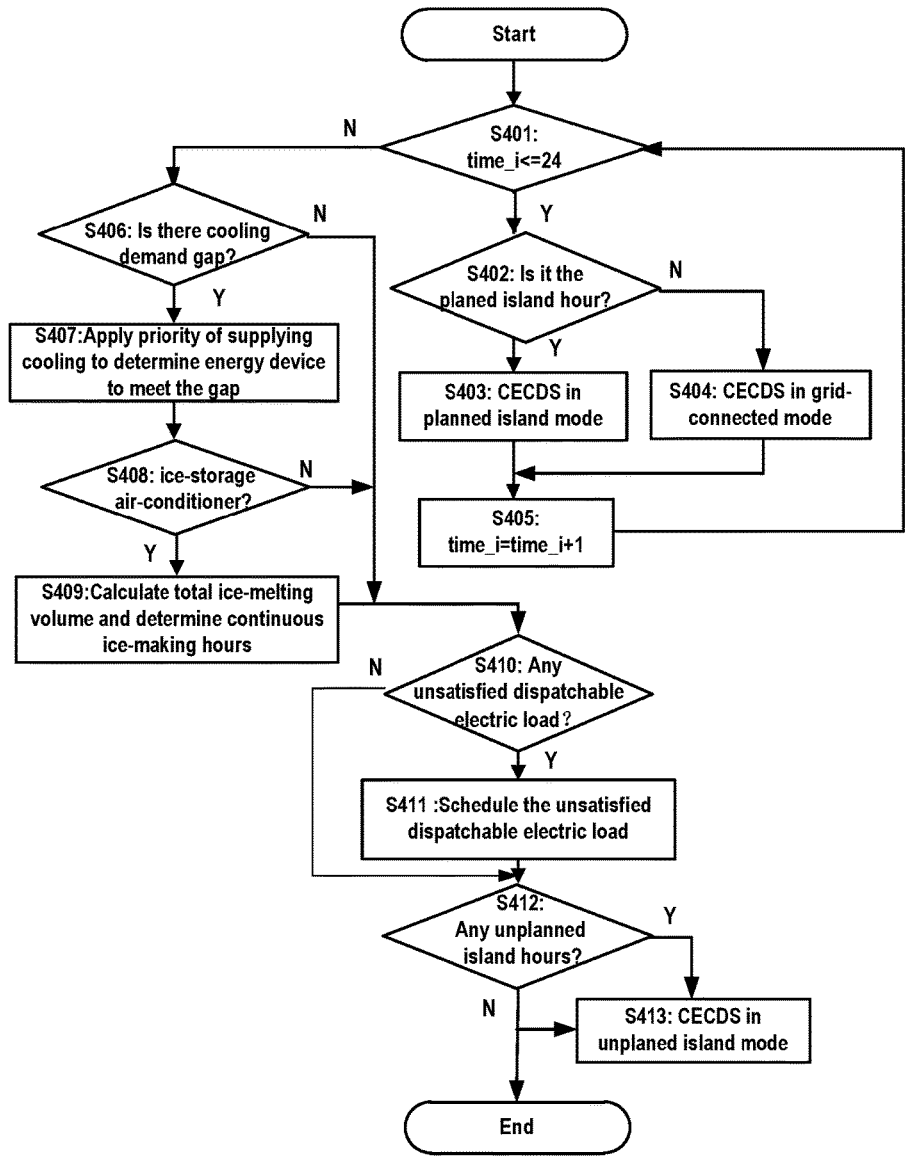
FIG. 4 schematically illustrates a flow chart of cooling & electricity (C&E) coordinated daily schedule (CECDS) process according to an example embodiment of the present disclosure.

FIG. 4 illustrates an exemplary CECDS process. As illustrated in FIG. 4, first at step S401, it is checked whether the hour time_i belongs to an hour in the day. If yes, then at step S402, it is checked if it is the time for planed island mode. If so, at step S403, it is determined that the micro grid will use the CECDS in the planed island mode; otherwise at step S404, it is determined that the micro grid will use the CECDS in grid-connected mode. Afterward, at step S405, the time index time_i is increased by 1 and the process enters another loop for the next hour. After the scheduling of all 24 hours of the day (no at step S401), at step S406, it is checked whether there is a cooling demand gap. If not, the process goes to step S410; otherwise, the process proceeds with step S407, and applies the priority of supply cooling to determine one or more energy devices so as to meet the cooling demand gap. If it is determined that the energy device comprises an ice-storage air conditioner (step S408), then at step S409, the total daily ice-melting volume is calculated and continuous ice-making hours is determined based on the ice-melting volume. Next at step S410, it is checked whether there is any unsatisfied dispatchable electric load; if so, at step S411 the unsatisfied dispatchable electric load may be scheduled to other hours of the day according to, for example, the priority of the electricity consuming price; otherwise the process goes to step S412. Afterwards, at step S412, it is checked whether there is any unplanned island hour during the day. If yes, at step S413, it is determined that the micro grid will use the CESDC process in the unplanned island mode.

For the CECDS process in grid-connected mode, the electricity energy may be supplied by the renewable energy, CCHP units and macro grid in a decreasing priority ranking thereof. The cooling energy may be supplied by rest of renewable energy after supplying electric load for air-conditioning, the CCHP units while satisfying electric demand, CCHP units while driving air-conditioning, CCHP while driving ice-melting, and the macro grid for ice-melting and for air-conditioning, and in a decreasing priority ranking thereof. Moreover, the matching relationship between the cooling demand and the electricity demand can also be considered to determine the operation mode of the CCHP units. Furthermore, due to the existence of air-conditioning and ice-melting, the CCHP's working modes in CECDS process are much more complex than those in HECDS process. Next, only for a purpose of illustration, an exemplary C&E coordinated schedule in MG grid-connected mode will be described with reference to FIG. 5.

Figure 5:
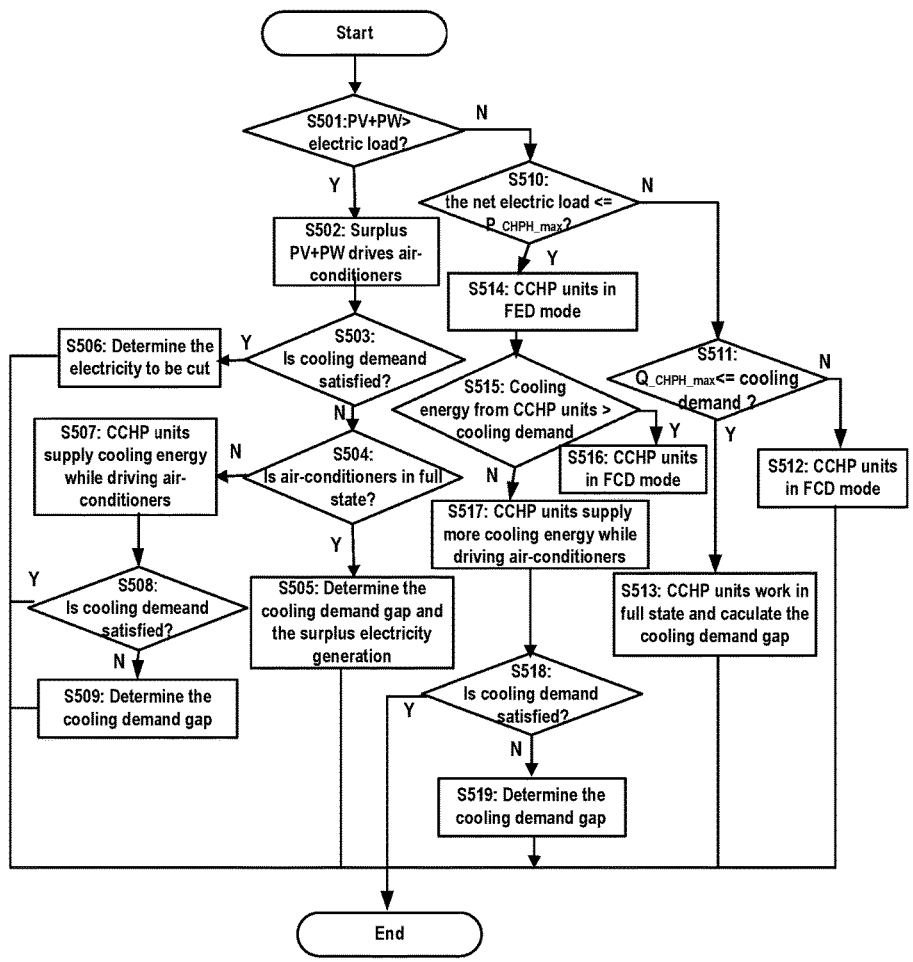
FIG. 5 schematically illustrates a flow chart of the CECDS in micro grid-connected mode according to an example embodiment of the present disclosure.

As illustrated in FIG. 5, first, at step S501, it is checked whether the renewable energy device (such as wind turbines, PV panels) can provide more electricity than power required by the electricity loads. If yes, the process goes to step S502; otherwise the process goes to step S510. At step S502, the surplus electricity will be used to drive the air conditioners. If at step S503, the cooling demand is met, then at step S506, the electricity to be cut should be calculated so as to save the energy; if the cooling demand is not satisfied at step S503, then at step S504, it will further be checked whether the air-conditioners work at a full state. If the air-conditioner is in the full state, then at step S505, the cooling demand gap and the surplus electricity generation (electricity to be cut) may be determined. If on the contrary, the air-conditioner is not in the full state at step S504, then at step S507, the CCHP units supply cooling energy while driving air-conditioner. After that, it is further checked at step S508, whether the cooling demand is satisfied. If it is satisfied, the process is ended; otherwise, the cooling demand gap is determined and the process is ended.

On the other hand, if at step S501, the renewable energy cannot meet the electricity demand, then at step S510, it is further checked whether the net electric load is equal to or lower than $P_{\_CCHP\_max}$, i.e., the maximum power that can be provided by CCHP unit. If no, it is further checked at step S511 whether $Q_{\_CCHP\_max}$, i.e., the maximum cooling energy that can be provided by the CCHP unit, is equal to or lower than the cooling demand. If it is not, it is determined at step S512 that the CCHP unit works in the FCD mode, in which the electricity generation of the CCHP units will be determined based on the cooling demand; otherwise at step S513, it is determined that the CCHP units work at full state and calculate the cooling demand gap. On the other hand, if the net electric load is equal to or lower than $P_{\_CCHP\_max}$ at step S510, then at step S514, it is determined that the CCHP units work in the FED mode in which the cool energy supply is determined based on the electricity demand. After that, at step S515, it is further checked whether the cooling energy supplied by the CCHP units working in FED mode is more than the cooling demand. If so, at step S516 it change the operation mode of the CCHP units from the FED mode to FCD mode, i.e., the electricity generation of the CCHP units will be determined based on the cooling demand so as to save the energy; otherwise at step S517, it is determined that the CCHP units will supply more cooling energy while driving air-conditioner. Further, at step S518 it is checked whether the cooling demand can be satisfied, if yes, and then the proceed ends; otherwise, the cooling demand gap is determined at step S519.

The C&E coordinated schedule in planned island mod is substantially similar to that in MG grid-connected mode but there are some difference. First, since the micro grid works in an island mode and cannot get more power from the macro grid and the electricity demand has priority over the cooling demand, the CCHPs unit can only work in FED mode. On the other hand, discharging of the storage battery is performed if CCHP units cannot satisfy the electricity demand or there is no electricity energy available for ice-melting. Next, for a purpose of illustration, an example CECDS process in the planned island mode is given in FIG. 6.

Figure 6:
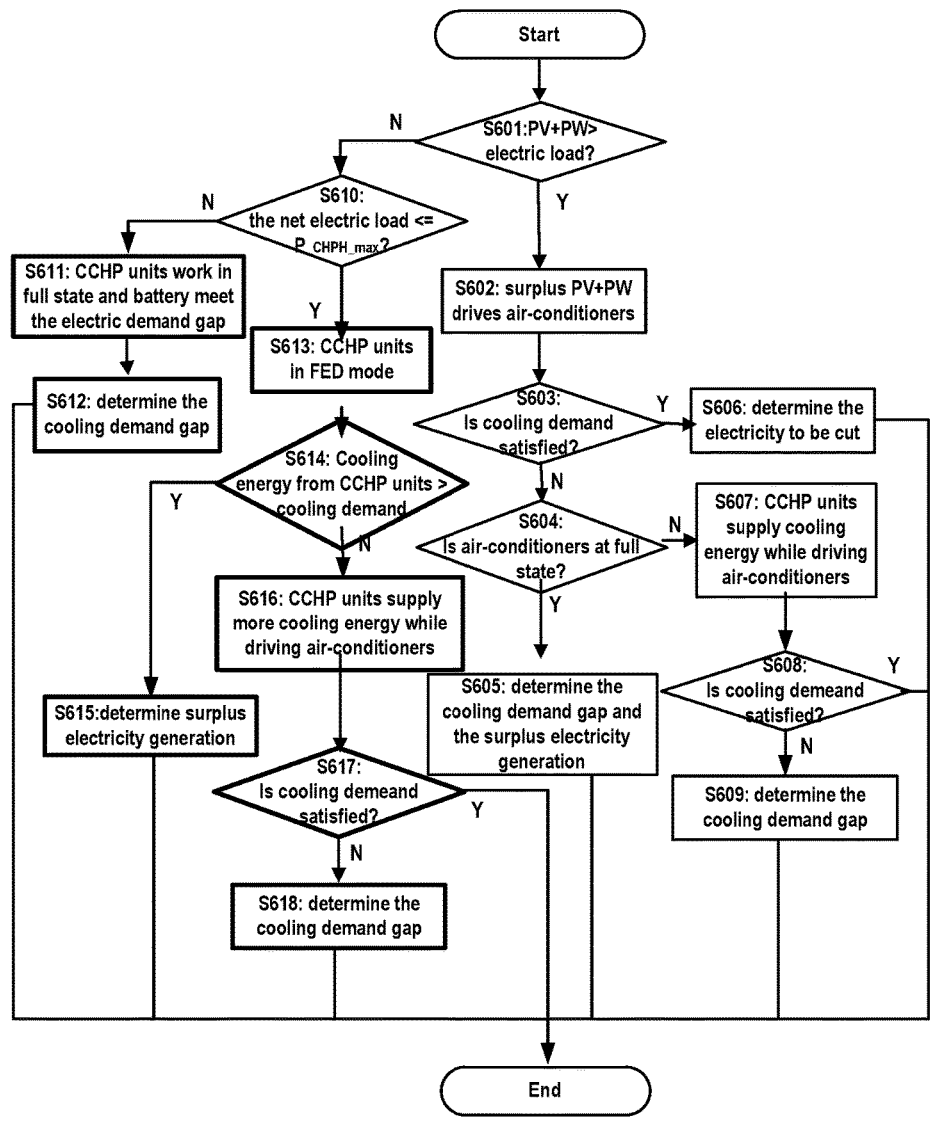
FIG. 6 schematically illustrates a flow chart of the CECDS in micro grid planned island mode according to an example embodiment of the present disclosure.

As illustrated in FIG. 6, first at step S601, it is checked whether the renewable energy device can provide more electricity than power required by the electricity loads. If yes, the process goes to step S602; otherwise the process goes to step S610. Operations of steps S602 to S609 which will be performed if the renewable energy device could provide more electricity are similar to those in steps S502 to S509 as illustrated in FIG. 5 and thus their detailed description will be omitted for a purpose of simplification. On the other hand, if the renewable energy device could provide more electricity than the electricity demand, at step S610, it will be further checked whether the net electric load is lower than or equal to the $P_{\_CCHP\_CHHP\_max}$. If the net electric load is larger than the $P_{\_CCHP\_max}$, at step S611, it is determined that the CCHP units will work in a full state and the battery storage is further used to meet the electric demand gap and then at step S612, the cooling demand gap is determined. If at step S610, the net electric load is not larger than $P_{\_CCHP\_max}$, then at step S613, it is determined that the CCHP units will work in FED mode. At step S614, it is further checked whether the cooling energy from the CCHP units could meet the cooling demand. If yes, at step S615, the surplus electricity generation will determined; otherwise, at step S616, it is determined that the CCHP units will supply more cooling energy and at the same time the electricity from the CCHP units will be used to drive air conditioners. Afterwards, at step S617, it is checked whether the cooling demand can be satisfied. If so the cooling demand will be determined at step S618; otherwise, the process is ended.

Regarding the CECDS in unplanned island mode, it is similar to that in the planned island mode but much more complex. When the occurring hour of unplanned island is valley-time period during which the ice-making is to be performed, the unplanned island will result in the reduction of the stored cooling energy. Thus, in such a case, in one or more following off-valley hours (i.e., ice-making hours), an ice-making re-scheduling should be implemented to adapt to the diminished available ice-melting. On the other hand, if the unplanned island happens at off-valley time, the available ice-melting will be limited to the original scheduled value.

Hereinafter, only for a purpose of illustration, an exemplary CECDS in unplanned island mode will be described with reference to FIGS. 7A to 7C, which together illustrate the CECDS in micro grid unplanned island mode according to an example embodiment of the present disclosure.

Figure 7A:
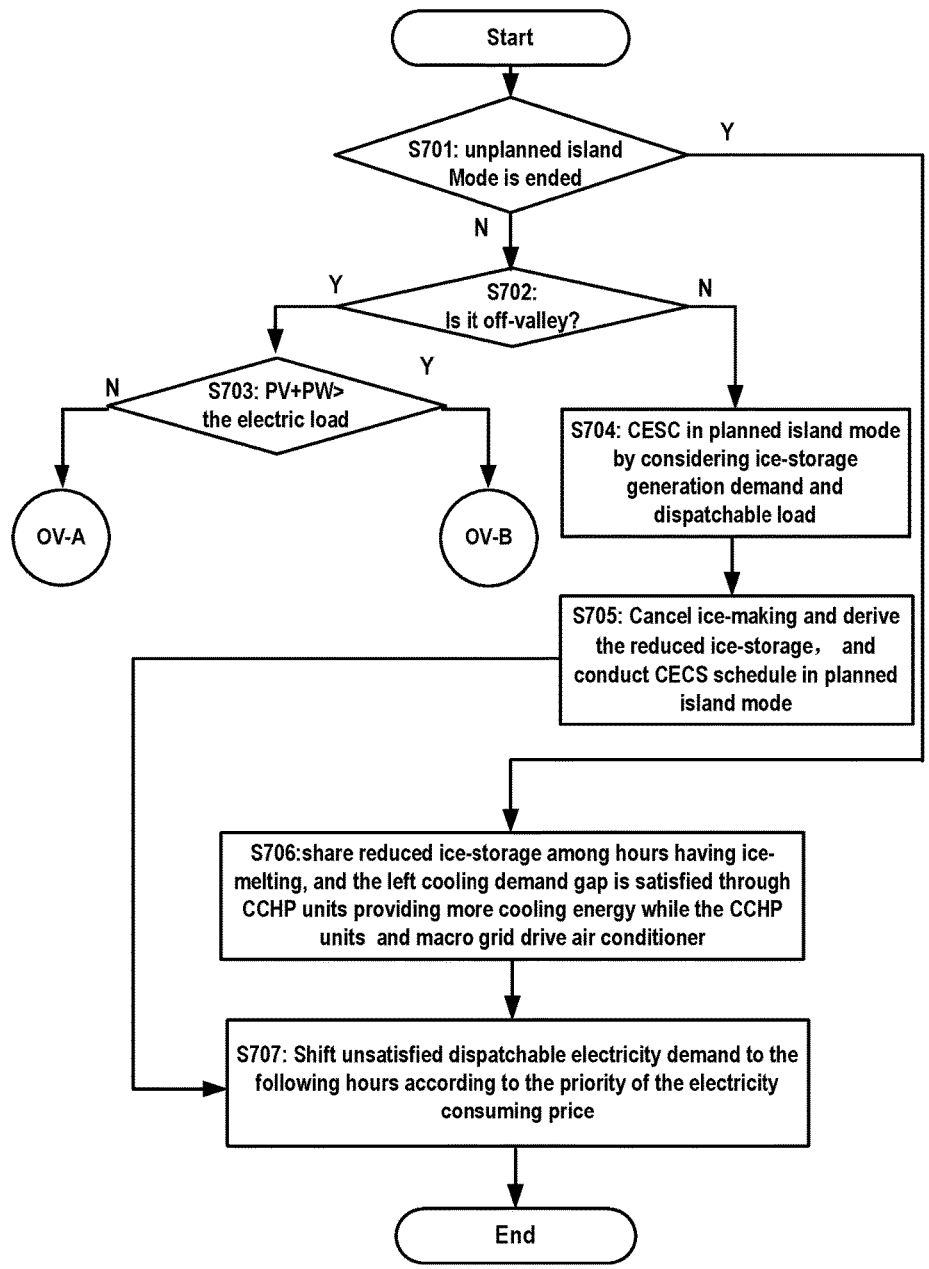
FIG. 7A to 7C schematically illustrate flow charts of the CECDS in micro grid unplanned island mode according to an example embodiment of the present disclosure.

Reference is first made to FIG. 7A, first at step S701, it is checked whether the unplanned island time is ended, for example whether the time_i is larger than the predetermined island-time number. If the unplanned island time is ended, then at step S706 the reduced ice-storage is shared among hours having ice-melting and the remaining cooling demand gap is satisfied through CCHP units, which will provide more cooling energy and at the same time the CCHP units and the macro grid will drive the air-conditioners. Then at step S707, the unsatisfied dispatchable electricity demand is shifted to the following hours according to the priority of the electricity consuming price.

If at step S701, the unplanned island time is not ended yet, then at step S702, it is checked whether the current time is off-valley time. If it is the valley time, then at step S704, the CESDC in planned island mode may be applied but it requires considering ice-storage generation demand and dispatchable load. That is to say, the reduced ice-making should be rescheduled to one or more following ice-making hours. Furthermore, at step S705, the ice-making may be canceled so as to meet the electricity demand first. Then at step S707, unsatisfied dispatchable electricity demand may be rescheduled to the following hours according to the priority of the electricity consuming price.

If at step S702, it is the off-valley time, then at step S703, it is further checked whether the renewable energy supply device can meet the electricity demand. If no, the process enters a sub-process OV-A which is illustrated in FIG. 7B; if yes, the process enters a sub-process OV-B, which is illustrated in FIG. 7C.

Figure 7B:
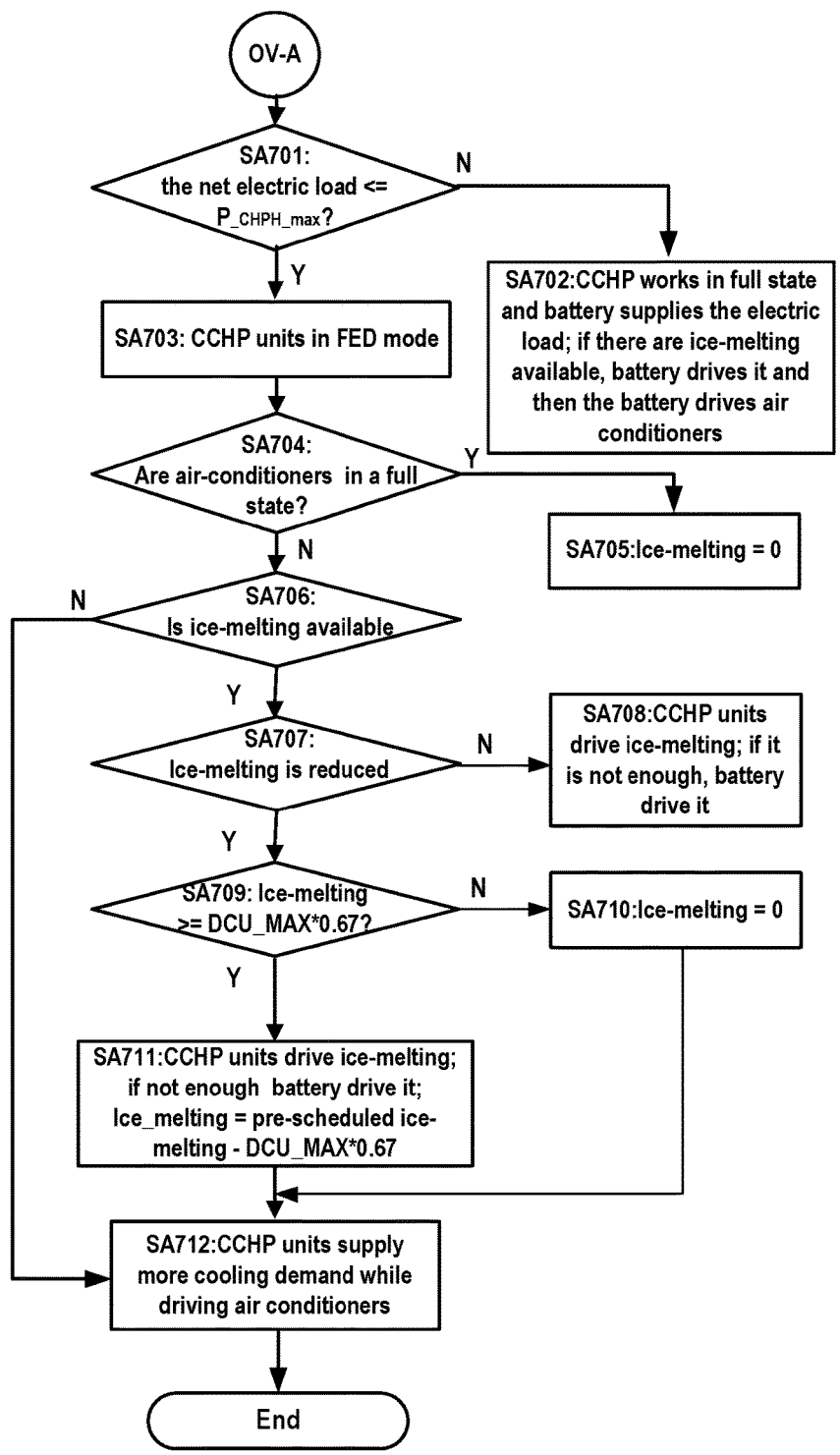

First referring to FIG. 7B, if the renewable energy supply device cannot meet the electricity demand (no at step S703), then in the sub-process OV-A, at step SA701, it is checked whether the net electric load is equal to or lower than the P_CCHP_max, if no, i.e. the current electricity demand gap is higher than the electricity that the CCHP unit could supply, at step SA702, it is determined that the CCHP units will work in full state and battery is further used to power the electric load; if there are ice-melting available, battery drives it and then the battery drives air conditioners. If the current electricity demand gap is not higher than $P_{\_CCHP\_max}$, at step SA703, the CCHP units work in the FED mode. Next, at step SA704, it is checked whether the air-conditioners are working in a full state. If yes, at step SA705, ice-melting is set as zero; if no, it is further checked at step SA706 whether the ice-melting available. If the ice-melting is not available, then the sub-process proceeds with step SA712; otherwise, the sub-process goes to step SA707 to further check whether the ice-melting is reduced. If the ice-melting is not reduced, at step S708, the CCHP units drive the ice-melting and the batter may be further used to drive the ice-melting if it is not enough. If the ice-melting is reduced, then at step SA709, it is further determined whether the ice-melting is higher than the ice making amount per hour, for example $DCU_{\_MAX}*0.67$. If it is not higher than the threshold, as step SA710, the ice-melting is set as zero; otherwise, at step SA711, the CCHP units drive the ice-melting and the battery is used to further drive the ice-melting if it is not enough and at the same time the ice-melting is limited to pre-scheduled ice-melting minus $DCU_{\_MAX}*0.67$. Then at step SA712, the CCHP units will supply more cooling energy to meet the cooling demand and, in the meanwhile, the electricity from the CCHP units will be used to drive the air-conditioners.

Figure 7C:
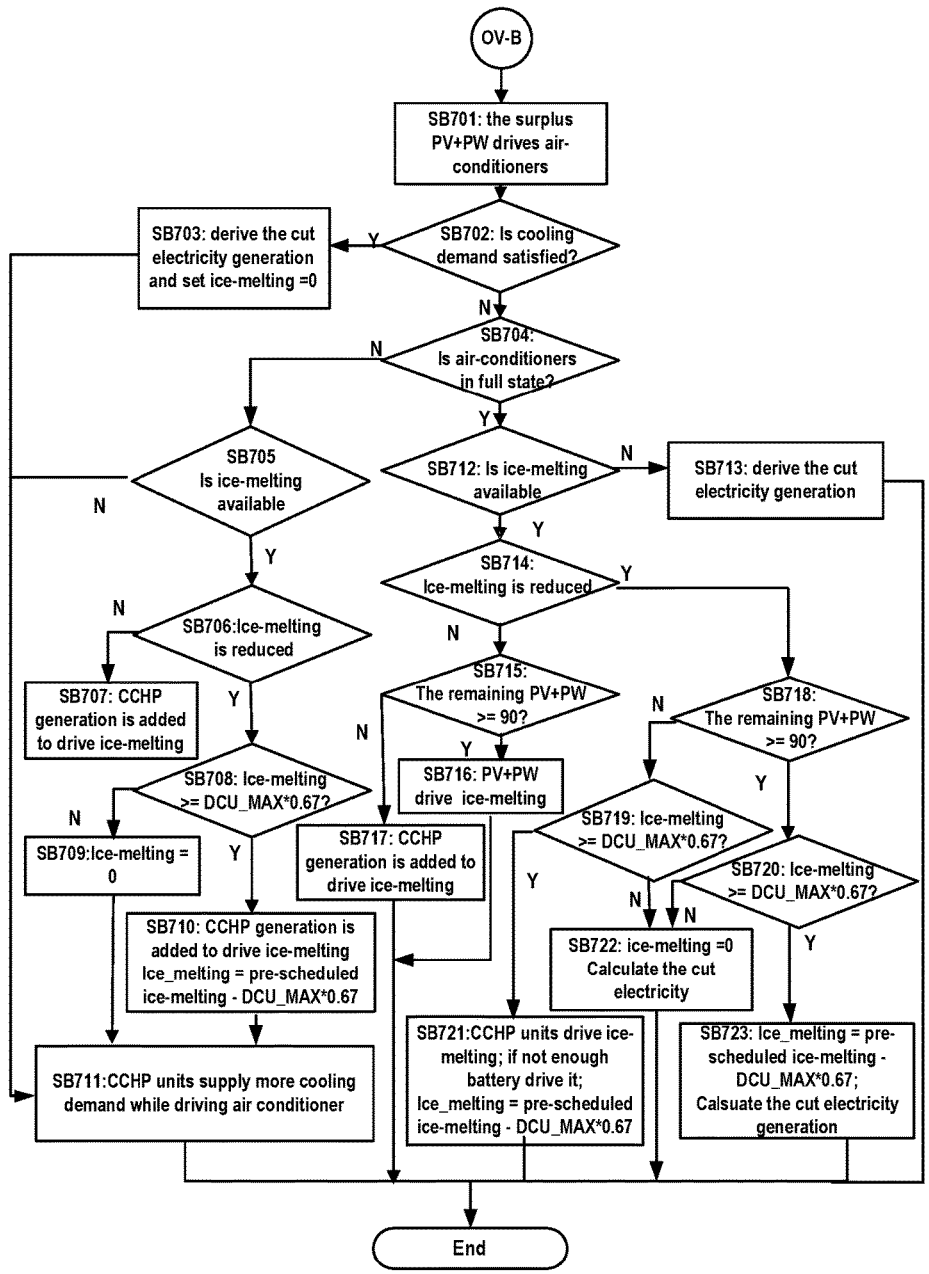

Next, reference is made to FIG. 7C to describe the sub-process OV-B which is performed when the renewable energy supply device can meet the electricity demand (yes at step S703). As illustrated in FIG. 7C, first at step SB701, the surplus renewable energy (i.e., the electricity supplied from PV panels and wind turbines but not including those meeting the electricity demand) drives the air-conditioners. Then it is checked, at step SB702, whether the cooling demand can be satisfied. If so, at step SB703, the cut electricity generation is calculated and the ice-melting is set as zero and the process goes to step SB711; if not, at step SB704, it is checked whether the air-conditioner is in a full state. If no, the air-conditioner is not in a full state then at step SB705, it is checked whether the ice-melting is available. If not, the process goes to step SB711; if the ice-melting is available, it is further determined at step SB706 whether the ice-melting is reduced; if not, at step SB707 the CCHP generation is used to drive the ice-melting; if so, it is further checked at step SB708 whether the ice-melting is larger than or equal to the ice making amount per hour, for example, $DCU_{MAX}*0.67$. If at step SB708, the ice-melting is lower than the predetermined threshold, at step SB709, the ice-melting is set as zero and the process goes to step SB711; if at step SB708, the ice-melting is larger than the predetermined threshold, then at step SB710, the CCHP generation is used to drive the ice-melting and the ice-melting is calculated as the pre-scheduled ice-melting minus the predetermined threshold and the process enters step SB711. At step SB711, the CCHP units supply more cooling demand while driving the air conditioners.

If, at step SB704, the air-conditioner is in a full state, then at step SB712, it is further checked whether the ice-melting is available. If the ice-melting is available, the sub-process goes to step SB714; otherwise, the sub-process goes to step SB713 at which the cut electricity generation will be calculated. At step SB714, it is further checked whether the ice-melting is reduced. If ice-melting is not reduced, then the sub-process goes to step SB715; otherwise, the sub-process goes to step SB718.

At step SB715, it is determined whether the remaining renewable energy is larger than or equal to the electric power consumption during the ice-melting such as 90. If the remaining renewable energy is larger than the predetermined energy limit, the renewable energy is used to drive the ice-melting at step SB716; otherwise at SB717 the CCHP generation is used to drive the ice-melting. Then the process is ended.

At step SB718, it is also checked whether the remaining renewable energy is larger than or equal to the electric power consumption during the ice-melting, such as 90. If the remaining renewable energy is less than the predetermined energy limit, the sub-process proceeds with step SB719; otherwise the sub-process proceeds with step SB720. At step SB719, it is checked whether the ice-melting is larger than or equal to the ice making amount per hour, such as $DCU_{MAX}*0.67$. If it is larger than or equal to the predetermined threshold, at step SB721, the CCHP units are used to drive the ice-melting and the battery is further used if it is not enough; at the same time, the ice-melting is determined as the pre-scheduled ice-melting minus the predetermined threshold. If at step SB719, the ice-melting is not larger than the predetermined threshold, at step SB722, the ice-melting is set as zero and the cut electricity generation is calculated. If at step SB718, the remaining renewable energy is larger than the electric power consumption during the ice-melting, such as 90, at step SB720, it is further checked whether the ice-melting is larger than or equal to the ice making amount per hour, such as $DCU_{MAX}*0.67$. If it is larger than the predetermined threshold, at step SB723, the ice-melting is determined as the pre-scheduled ice-melting minus the predetermined threshold and the cut electricity generation is calculated; if it is not larger than the ice making amount per hour, $DCU_{MAX}*0.67$, at step SB722, the ice-melting is set as zero and the cut electricity generation is calculated.

Hereinabove, specific strategies for the HECDS and CECDS in different operation modes are described at length; however, it should be appreciated they are presented only for a purpose of illustration. The skilled in the art may conceive many modifications, variations, alternatives from the teaching provided herein without departing the spirit of the present disclosure.

From the above description, it may also be seen that by means of such optimal operation strategies determined by performing the optimal scheduling process, energy supply priorities and operations modes of some of the multi-type energy supply devices can be determined, which can facilitate the searching of optimization solution in the capacity determination.

Micro Capacity Determination Optimization Solution

In embodiments of the present disclosure, the proposed MG capacity determination relates to a multi-objective and multi-constraint optimization. The conventional particle swarm optimization (PSO) is not suitable for searching the optimal capacity since it is a method for a single objective optimization. If the conventional PSO is applied, the multiple objectives should be combined into a single objective by weighing them, and at the same time penalties should be laid on the unsatisfied constraints and added to the single objective, which could make the optimization results worse.

Thus, another approach should be used to search the optimal solution for the micro grid. It is clear that the two optimization objectives of the present disclosure are in conflict with each other, i.e. the improvement of one objective might cause the deterioration of another objective. Consequently, the multi-objective particle swarm optimization MOPSO may be implemented to search the optimal solution for the micro grid.

In a multi-objective optimization, usually there is no unique globally optimal solution, but there exists a Pareto optimum set, composed by a group of mutually non-dominant solutions. Consequently, in the MOPSO implementation, a container is constructed to hold the Pareto non-dominant solutions, and the changes of the particles' speeds are guided by these non-dominant solutions. Hereinafter, an example process will be described to explain the approach to searching the optimal solution with reference to FIG. 8.

Figure 8:
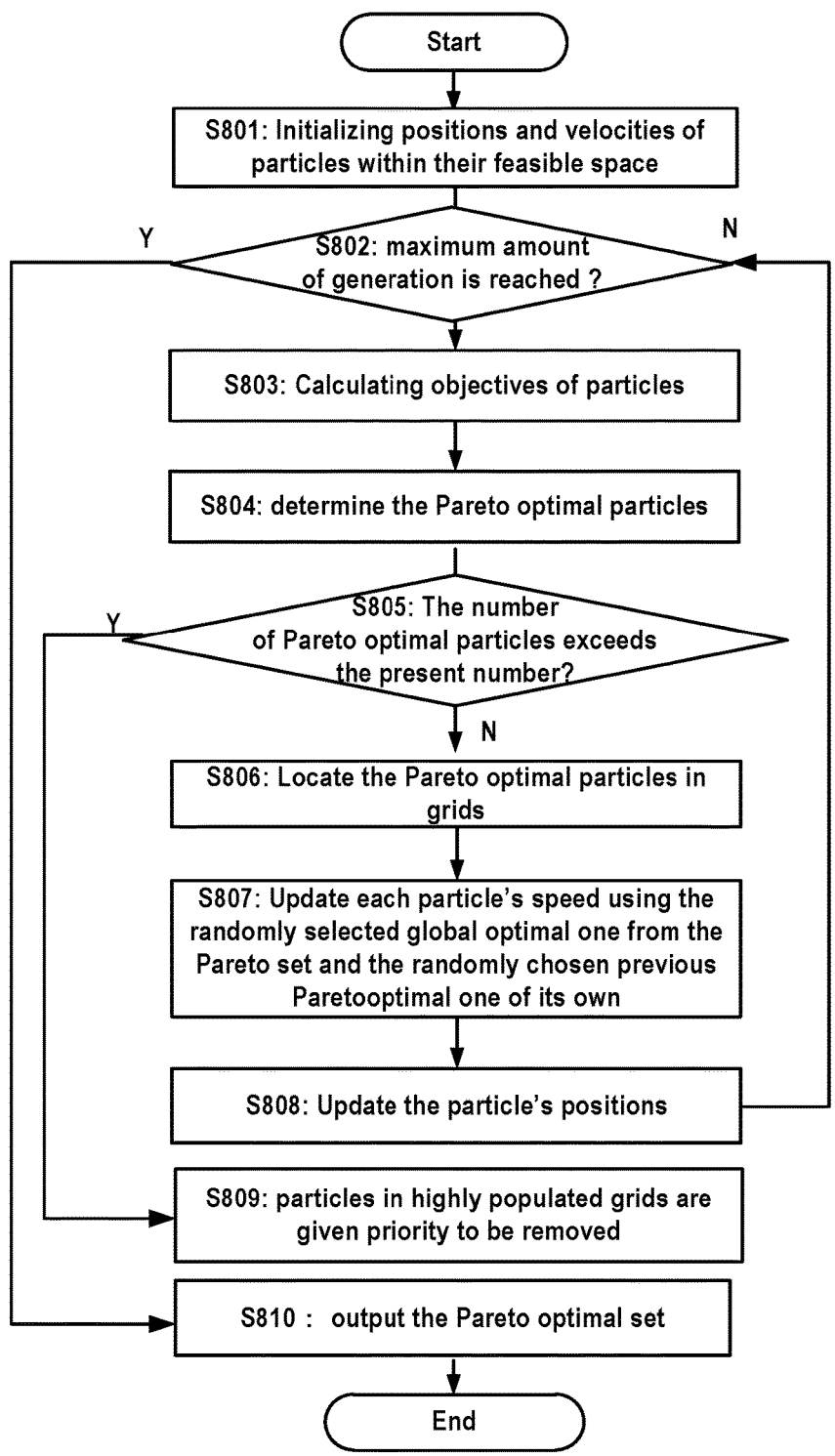
FIG. 8 schematically illustrates a flow chart of a method for performing the capacity determination process for a micro grid according to an example embodiment of the present disclosure.

In the MG capacity planning optimization, five dimensions of $N_{CCHP}$, $N_{PV}$, $N_{WT}$, $Q_{ice}$, $Q_{boiler}$ constitute a particle. As illustrated in FIG. 8, first at step S801, the speeds and positions of particles are initiated by considering the upper and lower constraints of the decisive variables, and for all the particles, the above mentioned MG optimal operation strategy for multi-type-energy supply and multi-operation-scenario is performed so the energy supply priorities and the operations modes of some of the multi-type energy supply devices can be determined. Then, at step S802, it is checked whether the maximum number of operations is reached. If so, then at step S810, the obtained Pareto optimal set can be output; otherwise, the process proceeds with step S803. At step S803, all the objectives of particles are calculated and then at step S804 the Pareto optimal particles are determined. Next, at step S805, it is checked whether the number of Pareto optimal particles exceeds the preset number. If so, at step S809 the particles in highly populated grids are given the priority to be removed; if not, the Pareto optimal particles are located in grids at step S806. After that, at step S807, each particle's speed is updated using the randomly selected global optimal solution from the Pareto set and the randomly chosen previous Pareto optimal solution of its own. Afterwards, at step S808, the particles' positions are updated and the process returns to step S802. The operations are repeated until the operations have been performed at the predetermined times.

By using the MOPSO, the Pareto non-dominant solutions could be obtained, which may provide feasible solution for the device capacity determination process as proposed herein.

Figure 9A:
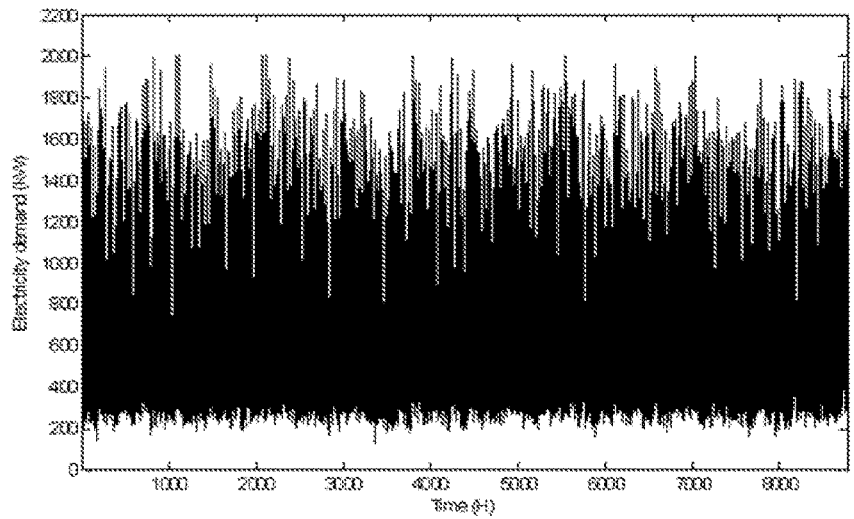
FIGS. 9A and 9B schematically illustrate diagrams of example thermal and electricity demands in each hour of a year used in a case simulation.
Figure 9B:
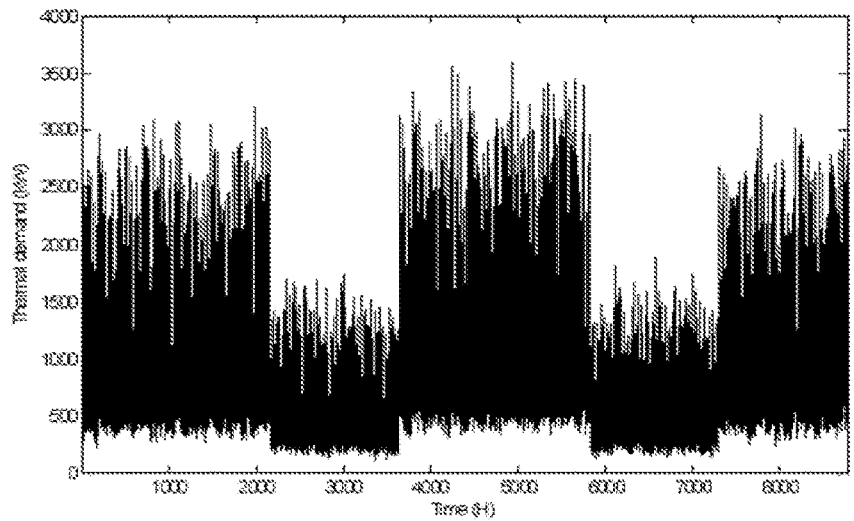
Figure 9C:
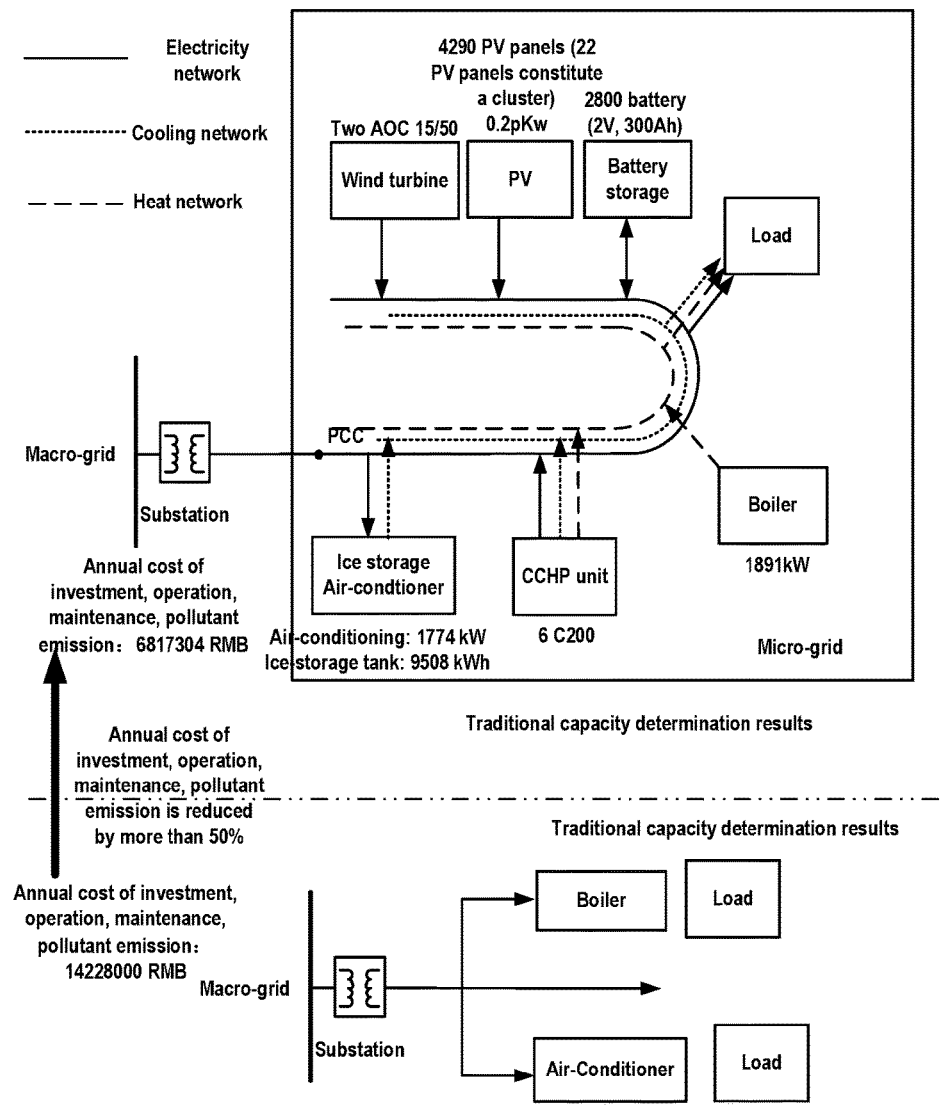
FIG. 9C schematically illustrates capacity determination results between a traditional capacity determination solution and the capacity determination solution according to an embodiment of the present disclosure.

In addition, FIGS. 9A and 9B illustrate electricity demand and thermal demand in a year used in a case simulation and FIG. 9C illustrates simulation results comparison between the optimal capacity determination process and traditional capacity determine process. First, as illustrated in FIGS. 9A and 9B, during the summer time from June to October, the micro grid supplies electricity and cooling energy to end users while during other seasons the micro grid supplies electricity and heating energy. In winter from Jan. to Mar., the heat demand is much higher than that in spring and autumn as shown in FIG. 9B.

In the case simulation, the electricity demand is divided into four classes, i.e. extremely important, important, dispatchable, and interruptable, which occupies 10%, 20%, 30% and 40%, respectively; the thermal demand is divided into two classes, i.e. important and cuttable, which occupies 60% and 40%, respectively.

The micro grid planned mode and the micro grid unplanned island mode both happened twice a year, and each time the island mode lasts for two hours. The maximum number of PV panels and wind turbines are limited by the available installation area, wherein $N_{WT\_max}=6$, $N_{PVserial\_max}=242$.

Simulation results of the optimal capacity determination according to an embodiment of in the present disclosure and results based on traditional capacity determination are shown in FIG. 9C. It could be seen that for the same electricity demand and thermal demand, the annual total cost of investment, operation, maintenance, pollutant emission in MG with multi-type energy supply for micro grid capacity determination solution is 6817304 RMB, while the cost for the traditional multi-type energy supply manner is about 1422800 RMB, which means more than 50% cost reduction.

Figure 10:
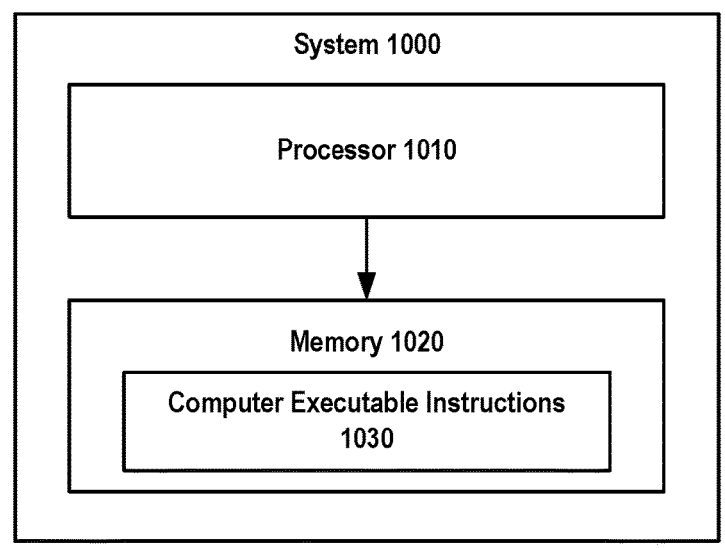
FIG. 10 schematically illustrates a block diagram of a system for capacity determination for a micro grid according to an example embodiment of the present disclosure.

Additionally, in embodiments of the present disclosure, there is also provided a system for capacity determination, which will be described with reference to FIG. 10. As illustrated in FIG. 10, system 1000 can comprise: at least one processor 1010; and at least one memory 1020 for storing computer executable instructions 1030. The at least one memory 1020 and the computer executable instructions 1030 are configured to, with the at least one processor, cause the system to: perform, a device capacity determination process for minimizing both annual integrated cost for the micro grid and annual energy outage cost, under constraints on electricity supply/demand balance and thermal energy supply/demand balance, and operation constraints on the multi-type energy supply devices, to determine respective numbers or capacities of the multi-type energy supply devices.

In an embodiment of the present disclosure, the micro grid may comprise a renewable energy supply device, a battery storage, an ice-storage air-conditioner, a combined cooling, heating and power CCHP unit, an ordinary air-conditioning device, and an ordinary heating supply device In another embodiment of the present disclosure, the annual integrated cost for the micro grid may comprise annual device investment cost, annual device operation cost, annual device maintenance cost and annual pollutant treatment cost, and the annual energy outage cost may comprise cost for electricity outage and cost for thermal energy outage.

In a further embodiment of the present disclosure, the operation constraints on the multi-type energy supply devices may comprise operation constraints on the CCHP unit including at least one of: an electricity output efficiency model for the CCHP unit; an electricity output and cooling output relationship model for the CCHP unit; and relationship between consumed gas volume and the electricity output and the electricity output efficiency of the CCHP unit.

In a still further embodiment of the present disclosure, the operation constraints on the multi-type energy supply devices may comprise operation constraints on the ice-storage air-conditioner including at least one of an operation model of the ice-storage air-conditioner in air-conditioning mode, an operation model of the ice-storage air-conditioner in ice-making mode, an operation model of the ice-storage air-conditioner in ice-melting mode, an operation model of the ice-storage air-conditioner in ice-melting & air-conditioning mode, and an operation model of ice-storage tank of the ice-storage air-conditioner.

In a yet further embodiment of the present disclosure, the device capacity determination process may be performed further under at least one of: annual utilization limit of renewable energy; annual discard limit of the renewable energy; upper and/or lower limits for the respective numbers or capacity of the multi-type energy supply devices; and upper and/or lower limits for electricity exchanged between the micro grid and a macro grid which the micro-grid can be connected.

In a still yet further embodiment of the present disclosure, an optimal energy scheduling process may be pre-performed by determining operation priorities of the multi-type energy supply devices and an operation mode of the CCHP unit at each time interval in a scheduling period based on matching relationship between thermal demand and electricity demand and operation scenarios of the micro grid with an aim of minimizing integrated cost and energy outage cost while keeping the electricity supply/demand balance and the thermal energy supply/demand balance.

In another further embodiment of the present disclosure, the thermal energy may comprise the cooling energy and heating energy, wherein the optimal energy scheduling process comprises a heating & electricity coordinated daily schedule process and a cooling & electricity coordinated daily schedule process.

In a further embodiment of the present disclosure, the heating & electricity coordinated daily schedule process may be configured to determine strategy of scheduling heating & electricity supply based on whether the micro-grid operates in a grid-connected mode or a planned island mode within each time interval of the scheduling period, and reschedule possible unsatisfied electricity load to one or more other time interval of the scheduling period, and apply an unplanned island mode to a time interval if a unplanned island event occurs within this time interval.

In a still further embodiment of the present disclosure, in the grid-connected mode, the electricity may be supplied by and in a priority order of the renewable energy supply device, the CCHP unit, and a macro grid to which the micro grid can be connected to, and the heating energy may be supplied by and in a priority order of the CCHP unit and the ordinary heating supply device; and wherein the operation mode of the CCHP unit may be determined based on matching relationship between thermal demand and electricity demand.

In a yet further embodiment of the present disclosure, in the planned island mode, the electricity may be supplied by and in a priority order of the renewable energy supply device, the CCHP unit and the storage battery, and the heating energy may be supplied by and in a priority order of the CCHP unit and the ordinary heating supply device, and wherein the CCHP unit may work in a mode in which supplied heating energy is determined by electricity.

In a still yet further embodiment of the present disclosure, in the unplanned island mode, the electricity load may be adjusted based on scheduled shift-in and shift-out electricity load, the electricity is supplied by and in an order of the renewable energy supply device, the CCHP unit and the storage battery; the heating energy may be supplied by and in a priority order of the CCHP unit and the ordinary heating supply device; and the CCHP unit may work in a mode in which supplied heating energy is determined by electricity.

In a still yet further embodiment of the present disclosure, wherein the cooling & electricity coordinated daily schedule process may be configured to determine a strategy of scheduling heating & electricity supply based on whether the micro-grid operates in a grid-connected mode or a planned island mode within each time interval of the scheduling period, determine the required continuous ice-making hours for a possible cooling demand gap, reschedule possible unsatisfied electricity load to one or more other time intervals in the scheduling period, and apply an unplanned island mode to a time interval if a unplanned island event occurs within this time interval.

In another embodiment of the present disclosure, wherein in the grid-connected mode, the electricity may be supplied by and in a priority order of the renewable energy, the CCHP unit and the macro grid, and the cooling energy may be supplied by and in a priority order of remaining renewable energy after supplying electric loads, the CCHP unit while supplying the electric loads, the CCHP unit while driving the ice-storage air-conditioner, the macro grid for driving the ice-storage air-conditioner and the ordinary air-conditioner, and wherein the operation mode of the CCHP unit may be determined based on the matching relationship between thermal demand and electricity demand.

In still another embodiment of the present disclosure, in the planned island mode, the electricity may be supplied by and in a priority order of the renewable energy, the CCHP unit and the battery storage, and the cooling energy may be supplied by and in a priority order of remaining renewable energy after supplying electric loads, the CCHP unit while supplying the electric loads, the CCHP unit while driving the ice-storage air-conditioner; and wherein the CCHP unit may work in a mode in which supplied cooling energy is determined by electricity and the battery storage may be used when there is no electricity available for ice-making.

In still yet another embodiment of the present disclosure, wherein in the unplanned island mode, if it is in a valley-time period, reduced amount of stored cooling energy of the ice-storage air-conditioner may be rescheduled to one or more following ice-making time intervals; if it is off-valley time, the ice-melting of the ice-storage air-conditioner may be limited to an originally scheduled value; the electricity may be supplied by and in an priority order of the renewable energy, the CCHP unit and the battery storage, the cooling energy may be supplied by and in the priority order of remaining renewable energy after supplying electric loads, the CCHP unit while supplying the electric loads, the CCHP unit while driving the ice-storage air-conditioner; and wherein the CCHP unit works in a mode in which the supplied cooling energy is determined by the electricity and the battery storage is used when there is no electricity available for ice-making.

In a further embodiment of the present disclosure, the device capacity determination process may be performed by means of a multiple-objective particle swarm optimization algorithm, and the number or capacity of the multi-types energy supplying device may be selected as particles of the multiple-objective particle swarm optimization algorithm.

Figure 11:
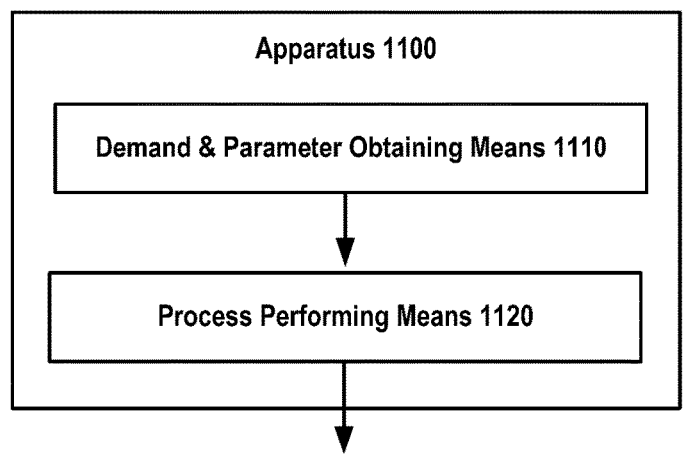
FIG. 11 schematically illustrates a block diagram of an apparatus for capacity determination for a micro grid according to an example embodiment of the present disclosure.

In addition, there is also provided an apparatus for capacity determination for a micro grid. As illustrated in FIG. 11, the apparatus 1100 may comprise means 1110 for obtain the electricity demand, the thermal demand and limits to parameters; and means 1120 for performing, a device capacity determination process for minimizing both annual integrated cost for the micro grid and annual energy outage cost, under constraints on electricity supply/demand balance and thermal energy supply/demand balance, and operation constraints on the multi-type energy supply devices, to determine respective numbers or capacities of the multi-type energy supply devices.

Figure 12:
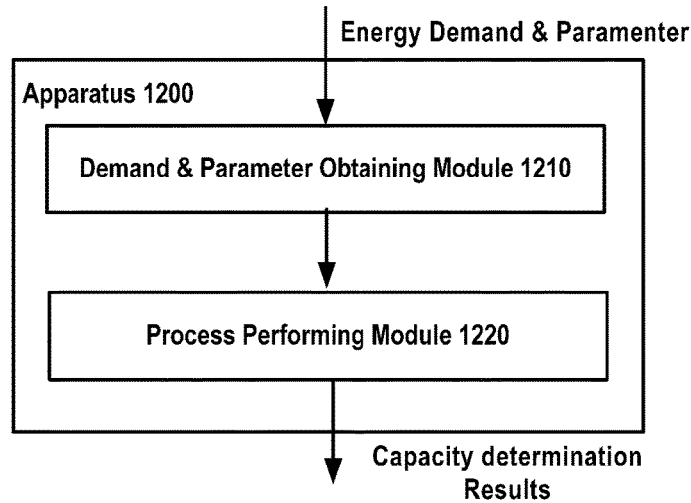
FIG. 12 schematically illustrates a block diagram of an apparatus for capacity determination for a micro grid according to another example embodiment of the present disclosure.

In addition, there is further provided another apparatus for capacity determination for a micro grid. FIG. 12 schematically illustrates a block diagram of apparatus for capacity determination in a micro-grid according to an example embodiment of the present disclosure. As illustrated in FIG. 12, the apparatus may comprise a demand & parameter obtaining module 1210 and a process performing module 1220. The demand & parameter obtaining module 1210 is configured to obtain the energy demand such as the electricity demand, the thermal demand in each hour of a year, and parameter limits such as limits as described hereinbefore. The process performing module 1220 may be configured to perform, a device capacity determination process for minimizing both annual integrated cost for the micro grid and annual energy outage cost, under constraints on electricity supply/demand balance and thermal energy supply/demand balance, and operation constraints on the multi-type energy supply devices, to determine respective numbers or capacities of the multi-type energy supply devices.

Furthermore, there is provided a tangible computer-readable medium having a plurality of instructions executable by a processor to determine device capacity for a micro grid, the tangible computer-readable medium comprises instructions configured to perform steps of the method according to any embodiments of method of the present disclosure.

It should be noted that operations of respective models or means as comprised in the system 1000, apparatus 1100, and apparatus 1200 substantially correspond to respective method steps as previously described. Therefore, for detailed operations of respective models or means in the system 1000, apparatus 1100 and apparatus 1200, please refer to the previous descriptions of the methods of the present disclosure with reference to FIGS. 1 to 9C.

Figure 13:
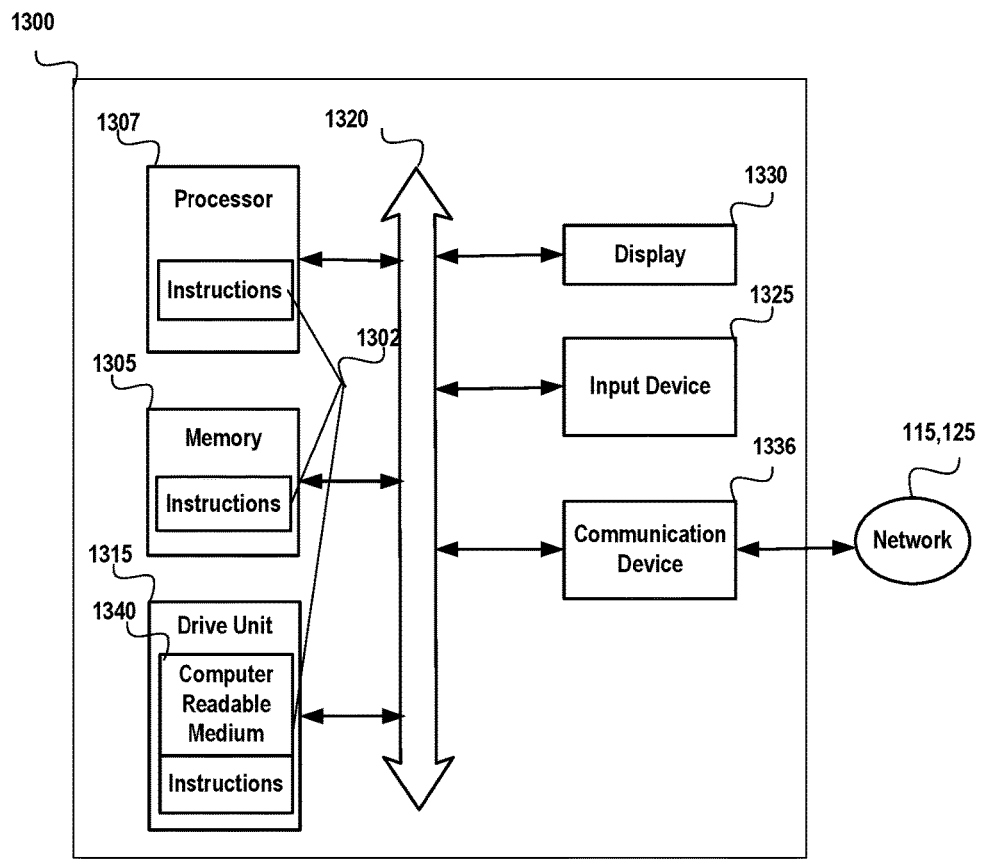
FIG. 13 schematically illustrates a general computer system, programmable to be a specific computer system, which may represent any of the computing devices referenced herein.

FIG. 13 is a general computer system 1300, which may represent any of the computing devices referenced herein. For instance, the general computer system 1300 may represent—in part or in its entirety—the control center, the head end, the integrated network operations and management system (NOMS), the fault, performance, and configuration management (FPCM) module, or any other computing devices referenced herein such as the end devices, the meters, the telemetry interface units (TIUs), the collectors, and/or any networked components such as routers, switches or servers as discussed herein. The computer system 1300 may include an ordered listing of a set of instructions 1302 that may be executed to cause the computer system 1300 to perform any one or more of the methods or computer-based functions disclosed herein. The computer system 1300 may operate as a stand-alone device or may be connected, e.g., using the network 115, 125, to other computer systems or peripheral devices.

In a networked deployment, the computer system 1300 may operate in the capacity of a server or as a client-user computer in a server-client user network environment, or as a peer computer system in a peer-to-peer (or distributed) network environment. The computer system 1300 may also be implemented as or incorporated into various devices, such as a personal computer or a mobile computing device capable of executing a set of instructions 1302 that specify actions to be taken by that machine, including and not limited to, accessing the network 115, 125 through any form of browser. Further, each of the systems described may include any collection of sub-systems that individually or jointly execute a set, or multiple sets, of instructions to perform one or more computer functions.

The computer system 1300 may include a processor 1307, such as a central processing unit (CPU) and/or a graphics processing unit (GPU). The processor 1307 may include one or more general processors, digital signal processors, application specific integrated circuits, field programmable gate arrays, digital circuits, optical circuits, analog circuits, combinations thereof, or other now known or later-developed devices for analyzing and processing data. The processor 1307 may implement the set of instructions 1302 or other software program, such as manually-programmed or computer-generated code for implementing logical functions. The logical function or any system element described may, among other functions, process and/or convert an analog data source such as an analog electrical, audio, or video signal, or a combination thereof, to a digital data source for audio-visual purposes or other digital processing purposes such as for compatibility with computer processing or networked communication.

The computer system 1300 may include a memory 1305 on a bus 1320 for communicating information. Code operable to cause the computer system to perform any of the acts or operations described herein may be stored in the memory 1305. The memory 1305 may be a random-access memory, read-only memory, programmable memory, hard disk drive or any other type of volatile or non-volatile memory or storage device.

The computer system 1300 may also include a disk, solid-state drive optical drive unit 1315. The disk drive unit 1315 may include a non-transitory or tangible computer-readable medium 1340 in which one or more sets of instructions 1302, e.g., software, can be embedded. Further, the instructions 1302 may perform one or more of the operations as described herein. The instructions 1302 may reside completely, or at least partially, within the memory 1305 and/or within the processor 1307 during execution by the computer system 1300. The database or any other databases described above may be stored in the memory 1305 and/or the disk unit 1315.

The memory 1305 and the processor 1307 also may include computer-readable media as discussed above. A "computer-readable medium," "computer-readable storage medium," "machine readable medium," and/or "signal-bearing medium" may include any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, or device.

Additionally, the computer system 1300 may include an input device 1325, such as a keyboard or mouse, configured for a user to interact with any of the components of system 1300, including user selections or menu entries of display menus. It may further include a display 1330, such as a liquid crystal display (LCD), a cathode ray tube (CRT), or any other display suitable for conveying information. The display 1330 may act as an interface for the user to see the functioning of the processor 1307, or specifically as an interface with the software stored in the memory 1305 or the drive unit 1315.

The computer system 1300 may include a communication interface 1336 that enables communications via the communications network 125. The network 125 may include wired networks, wireless networks, or combinations thereof. The communication interface 1336 networks may enable communications via any number of communication standards, such as Ethernet AVB, 802.11, 802.17, 802.20, WiMax, or other communication standards.

Accordingly, the system may be realized in hardware, software, or a combination of hardware and software. The system may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein. Such a programmed computer may be considered a special-purpose computer.

As described herein, any modules or processing boxes are defined to include software, hardware or some combination thereof executable by the processor 1307. Software modules may include instructions stored in the memory 1305, or other memory device, that are executable by the processor 1307 or other processors. Hardware modules may include various devices, components, circuits, gates, circuit boards, and the like that are executable, directed, and/or controlled for performance by the processor 1307.

The system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

By far, the present disclosure has been described with reference to the accompanying drawings through particular preferred embodiments. However, it should be noted that the present disclosure is not limited to the illustrated and provided particular embodiments, but various modification may be made within the scope of the present disclosure.

Further, the embodiments of the present disclosure can be implemented in software, hardware or the combination thereof. The hardware part can be implemented by a special logic; the software part can be stored in a memory and executed by a proper instruction execution system such as a microprocessor or a dedicated designed hardware. Those normally skilled in the art may appreciate that the above method and system can be implemented with a computer-executable instructions and/or control codes contained in the processor, for example, such codes provided on a bearer medium such as a magnetic disk, CD, or DVD-ROM, or a programmable memory such as a read-only memory (firmware) or a data bearer such as an optical or electronic signal bearer. The apparatus and its components in the present embodiments may be implemented by hardware circuitry, for example, a very large scale integrated circuit or gate array, a semiconductor such as logical chip or transistor, or a programmable hardware device such as a field-programmable gate array, or a programmable logical device, or implemented by software executed by various kinds of processors, or implemented by combination of the above hardware circuitry and software, for example, by firmware.

While various embodiments of the disclosure have been described, it will be apparent to those of ordinary skill in the art that many more embodiments and implementations are possible within the scope of the disclosure. Accordingly, the disclosure is not to be restricted except in light of the attached claims and their equivalents.

The three constraints given in equation (32) may be selected based on requirements in real application. Particularly, the given three constraints respectively correspond to cases in which it is forbidden to provide the electricity back to the macro-grid; it is allowed to exchange power between the macro-grid and the micro grid in both directions; it is forbidden to exchange the power between the macro-grid and the micro grid.

What is claimed is:

1. A system for capacity determination for a micro grid, wherein the micro grid comprises multi-type energy supply devices to provide both electricity and thermal energy, the system comprising:
    at least one processor; and
    at least one memory that is non-transitory, the at least one memory storing computer executable instructions,
    wherein the at least one memory and the computer executable instructions are executable by the at least one processor, to cause the system to:
        perform, a device capacity determination process for minimizing both annual integrated resource allocations for the micro grid and annual energy outages, the device capacity determination process performed under constraints on electricity supply/demand balance and thermal energy supply/demand balance, and operation constraints on the multi-type energy supply devices;
        determine respective numbers or capacities of the multi-type energy supply devices; and
        generate an output to a user interface of results that include the determined respective number or capacities.

2. The system according to claim 1, wherein the micro grid comprises a renewable energy supply device, a battery storage, an ice-storage air-conditioner, a combined cooling, heating and power (CCHP) unit, an air-conditioning device, and a heating supply device.

3. The system according to claim 2, wherein the annual integrated resource allocations for the micro grid comprises annual device investment, annual device operation, annual device maintenance and annual pollutant treatment, and the annual energy outages comprises electricity outages and thermal energy outages.

4. The system according to claim 2, wherein the operation constraints on the multi-type energy supply devices comprise operation constraints on the CCHP unit including at least one of:
    an electricity output efficiency model for the CCHP unit;
    an electricity output and cooling output relationship model for the CCHP unit; or
    relationship between consumed gas volume and the electricity output and the electricity output efficiency of the CCHP unit.

5. The system according to claim 2, wherein the operation constraints on the multi-type energy supply devices comprise operation constraints on the ice-storage air-conditioner including at least one of:
    an operation model of the ice-storage air-conditioner in air-conditioning mode,
    an operation model of the ice-storage air-conditioner in ice-making mode,
    an operation model of the ice-storage air-conditioner in ice-melting mode,
    an operation model of the ice-storage air-conditioner in ice-melting & air-conditioning mode, or
    an operation model of ice-storage tank of the ice-storage air-conditioner.

6. The system according to claim 1, wherein performance of the device capacity determination process comprises at least one of:
    annual utilization limit of renewable energy;
    annual discard limit of the renewable energy;
    upper and/or lower limits for the respective numbers or capacity of the multi-type energy supply devices; or
    upper and/or lower limits for electricity exchanged between the micro grid and a macro grid which the micro-grid can be connected.

7. The system according to claim 2, wherein the at least one memory and the computer executable instructions are further executable by the at least one processor, to cause the system to: pre-perform an optimal energy scheduling process by determination of operation priorities of the multi-type energy supply devices and an operation mode of the CCHP unit at each time interval in a scheduling period based on matching relationship between thermal demand and electricity demand and operation scenarios of the micro grid, the determination of operation priorities pre-performed in accordance with a goal of minimization of integrated resource allocations and energy outages and preservation of the electricity supply/demand balance and the thermal energy supply/demand balance.

8. The system according to claim 7, wherein the thermal energy comprises cooling energy and heating energy, wherein the optimal energy scheduling process comprises a heating and electricity coordinated daily schedule process and a cooling and electricity coordinated daily schedule process.

9. The system according to claim 8, wherein the at least one memory and the computer executable instructions are further executable by the at least one processor, to cause the system to determine, as at least part of the heating and electricity coordinated daily schedule process, a strategy of scheduling heating and electricity supply based on operation of the micro-grid in one of a grid-connected mode or a planned island mode within each time interval of the scheduling period, and to cause the system to reschedule possible unsatisfied electricity load to one or more other time intervals of the scheduling period, and apply an unplanned island mode to a time interval in response to occurrence of an unplanned island event within the time interval;

wherein, in the grid-connected mode, the at least one memory and the computer executable instructions are further executable by the at least one processor to cause the system to: determine the operation mode of the CCHP unit based on matching a relationship between thermal demand and electricity demand, control the supply of electricity in a priority order of the renewable energy supply device, the CCHP unit, and a macro grid to which the micro grid can be connected to, and control the supply of the heating energy in a priority order of the CCHP unit and the ordinary heating supply device;

wherein, in the planned island mode, the at least one memory and the computer executable instructions are further executable by the at least one processor to cause the system to: operate the CCHP unit in a mode in which supplied heating energy is determined by electricity, control the supply of the electricity by a priority order of the renewable energy supply device, the CCHP unit and the storage battery, and control the supply of the heating energy by a priority order of the CCHP unit and the ordinary heating supply device; and wherein, in the unplanned island mode, the at least one memory and the computer executable instructions are further executable by the at least one processor, to cause the system to: operate the CCHP unit in a mode in which supplied heating energy is determined by electricity, adjust the electricity based on scheduled shift-in and shift-out electricity load, control the supply of the electricity in a priority order of the renewable energy supply device, the CCHP unit and the storage battery; and control the supply of the heating energy in a priority order of the CCHP unit and the ordinary heating supply device.

10. The system according to claim 8, wherein the at least one memory and the computer executable instructions are further executable by the at least one processor, to cause the system to determine, as at least part of the cooling and electricity coordinated daily schedule process, a strategy of scheduling heating and electricity supply based on operation of the micro-grid in one of a grid-connected mode or a planned island mode within each time interval of the scheduling period, to cause the system to determine the required continuous ice-making hours for a possible cooling demand gap, to cause the system to reschedule possible unsatisfied electricity load to one or more other time intervals in the scheduling period, and to cause the system to apply an unplanned island mode to a time interval in response to occurrence of an unplanned island event within the time interval;

wherein in the grid-connected mode, the at least one memory and the computer executable instructions are further executable by the at least one processor to cause the system to: determine the operation mode of the CCHP unit based on a matching relationship between thermal demand and electricity demand, control the supply of electricity in a priority order of the renewable energy, the CCHP unit and the macro grid, and control the supply of the cooling energy in a priority order of remaining renewable energy after supplying electric loads, the CCHP unit while supplying the electric loads, the CCHP unit while driving the ice-storage air-conditioner, the macro grid for driving the ice-storage air-conditioner and the ordinary air-conditioner;

wherein, in the planned island mode, the at least one memory and the computer executable instructions are further executable by the at least one processor to cause the system to: operate the CCHP unit in a mode in which supplied cooling energy is determined by electricity and the battery storage is used when there is no electricity available for ice-making, control the supply of the electricity in a priority order of the renewable energy, the CCHP unit and the battery storage, and control the supply of the cooling energy in a priority order of remaining renewable energy after supplying electric loads, the CCHP unit while supplying the electric loads, the CCHP unit while driving the ice-storage air-conditioner; and wherein in the unplanned island mode, the at least one memory and the computer executable instructions are further executable by the at least one processor, to cause the system to: determine the operation mode of the CCHP in which supplied cooling energy is determined by the electricity and the battery storage is used when there is no electricity available for ice-making, reschedule a reduced amount of stored cooling energy of the ice-storage air-conditioner to one or more following ice-melting time intervals in response to the CCHP unit being in a valley-time period, substantially maintain an originally scheduled value of the ice-melting of the ice-storage air-conditioner in response to the CCHP unit being in an off-valley time period; control the supply of the electricity in a priority order of the renewable energy, the CCHP unit and the battery storage, and control the supply of the cooling energy in the priority order of remaining renewable energy after supplying electric loads, the CCHP unit while supplying the electric loads, the CCHP unit while driving the ice-storage air-conditioner.

11. The system according to claim 1, wherein the at least one memory and the computer executable instructions are further executable by the at least one processor to cause the system to perform the device capacity determination process with a multiple-objective particle swarm optimization algorithm in which the number or capacity of the multi-type energy supplying devices are selected as particles of the multiple-objective particle swarm optimization algorithm.

12. A method for capacity determination for a micro grid, wherein the micro grid comprises multi-type energy supply devices to provide both electricity and thermal energy, the method comprising:
performing, a device capacity determination process for minimizing both annual integrated resource allocation for the micro grid and annual energy outages,
applying constraints on electricity supply/demand balance and thermal energy supply/demand balance;
applying operation constraints on the multi-type energy supply devices;
determining respective numbers or capacities of the multi-type energy supply devices; and
displaying values of the respective numbers or capacities of the multi-type energy supply devices on a user interface.

13. The method according to claim 12, wherein the multi-type energy supply devices comprise a renewable energy supply device, a battery storage, an ice-storage air-conditioner, a combined cooling, heating and power (CCHP) unit, an ordinary air-conditioning device, and an ordinary heating supply device, and the annual integrated resource allocation for the micro grid comprises annual device investment, annual device operation, annual device maintenance and annual pollutant treatment for the multi-type energy supply devices, and the annual energy outages comprise electricity outages and thermal energy outages related to the multi-type energy supply devices.

14. The method according to claim 13, wherein applying the operation constraints on the multi-type energy supply devices comprises applying operation constraints on the CCHP unit including at least one of:
   an electricity output efficiency model for the CCHP unit;
   an electricity output and cooling output relationship model for the CCHP unit; or
   relationship between consumed gas volume and the electricity output and the electricity output efficiency of the CCHP unit.

15. The method according claim 13, wherein applying the operation constraints on the multi-type energy supply devices comprises applying operation constraints on the ice-storage air-conditioner including at least one of
   an operation model of the ice-storage air-conditioner in air-conditioning mode,
   an operation model of the ice-storage air-conditioner in ice-making mode,
   an operation model of the ice-storage air-conditioner in ice-melting mode,
   an operation model of the ice-storage air-conditioner in ice-melting & air-conditioning mode, or
   an operation model of ice-storage tank of the ice-storage air-conditioner.

16. The method according to claim 12, wherein performing the device capacity determination process comprises performing the device capacity determination process according to at least one of:
   annual utilization limit of renewable energy;
   annual discard limit of the renewable energy;
   upper and/or lower limits for the respective numbers or capacity of the multi-type energy supply devices; or
   upper and/or lower limits for electricity exchanged between the micro grid and a macro grid which the micro-grid can be connected.

17. The method according to claim 13, further comprising pre-performing an optimal energy scheduling process by determining operation priorities of the multi-type energy supply devices and an operation mode of the CCHP unit at each time interval in a scheduling period based on matching relationship between thermal demand and electricity demand and operation scenarios of the micro grid with an aim of minimizing integrated resource allocation and energy outages while keeping the electricity supply/demand balance and the thermal energy supply/demand balance.

18. The method according to any of claim 17, wherein the thermal energy comprises the cooling energy and heating energy, wherein the optimal energy scheduling process comprises a heating and electricity coordinated daily schedule process and a cooling and electricity coordinated daily schedule process.

19. The method according to claim 12, wherein performing the device capacity determination process comprises performing a multiple-objective particle swarm optimization by selecting the number or capacity of the multi-types energy supplying device as particles of the multiple-objective particle swarm optimization.

20. A tangible computer readable medium comprising instructions executable by a processor, the tangible computer readable medium comprising:
   instructions executable by the processor to perform a device capacity determination process for minimizing both annual integrated resource allocation for a micro grid and annual energy outages, the micro grid comprising multi-type energy supply devices to provide both electricity and thermal energy;
   instructions executable by the processor to perform the device capacity determination process under constraints on electricity supply/demand balance and thermal energy supply/demand balance;
   instructions executable by the processor to perform the device capacity determination process under operation constraints on the multi-type energy supply devices;
   instructions executable by the processor to determine respective numbers or capacities of the multi-type energy supply devices based on the device capacity determination process, constraints on electricity supply/demand balance and thermal energy supply/demand balance, and operation constraints on the multi-type energy supply devices; and
   instructions executable by the processor to output values for the determined respective numbers or capacities of the multi-type energy supply devices.

* * * * *

UNITED STATES PATENT AND TRADEMARK OFFICE
CERTIFICATE OF CORRECTION

PATENT NO. : 10,290,064 B2
APPLICATION NO. : 15/520370
DATED : May 14, 2019
INVENTOR(S) : Zin Zhou et al.

Page 1 of 1

It is certified that error appears in the above-identified patent and that said Letters Patent is hereby corrected as shown below:

In the Specification

Column 3, Line 14, delete "10" between CCHP and unit.

Column 8, Line 2, delete "boiler," and insert --boiler;--.

Signed and Sealed this
Twenty-fourth Day of September, 2019

Andrei Iancu
*Director of the United States Patent and Trademark Office*